United States Patent
Choi et al.

(10) Patent No.: US 10,148,587 B2
(45) Date of Patent: Dec. 4, 2018

(54) DEVICE AND METHOD FOR SHARING CONTENT USING THE SAME

(71) Applicant: Samsung Electronics Co. Ltd., Suwon-si, Gyeonggi-do (KR)

(72) Inventors: Sun Choi, Seongnam-si (KR); Won-jong Choi, Daejeon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 150 days.

(21) Appl. No.: 13/973,309

(22) Filed: Aug. 22, 2013

(65) Prior Publication Data
US 2014/0059231 A1    Feb. 27, 2014

(30) Foreign Application Priority Data

Aug. 22, 2012 (KR) ......................... 10-2012-0091877

(51) Int. Cl.
*G06F 15/16* (2006.01)
*H04L 12/911* (2013.01)
(Continued)

(52) U.S. Cl.
CPC ............. *H04L 47/70* (2013.01); *G06Q 10/10* (2013.01); *G06Q 50/01* (2013.01);
(Continued)

(58) Field of Classification Search
CPC . H04L 65/403; H04L 12/2812; H04L 63/083; H04L 67/02; H04L 2012/2849; H04L 67/06; H04L 67/26; H04L 67/36; H04L 69/24; H04L 9/0888; H04L 9/3213; H04L 9/3234; H04L 67/10; H04L 67/306; H04L 12/282; H04L 51/04; H04L 51/32;
(Continued)

(56) References Cited

U.S. PATENT DOCUMENTS 5,552,806 A    9/1996  Lenchik
8,832,294 B2   9/2014  Sung et al.
(Continued)

FOREIGN PATENT DOCUMENTS

CN    101431483 A    5/2009
CN    101815100 A    8/2010
(Continued)

OTHER PUBLICATIONS

Coppola et al.; Information Filtering and Retrieving of Context-Aware Applications Within the MoBe Framework; Jan. 1, 2005; pp. 1-14; Department of Mathematics and Computer Science, University of Udine, Italy.
(Continued)

*Primary Examiner* — Djenane M Bayard
(74) *Attorney, Agent, or Firm* — Jefferson IP Law, LLP

(57) ABSTRACT

A method for sharing content of a device is provided. The method includes receiving, by an inputter, an input of a share command of a selected content, recommending at least one service to share the content among a plurality of services that are available in the device and a share target, and sharing, by a controller, the content with the share target selected through the selected service based on a selection input with respect to the at least one recommended service and the share target.

14 Claims, 25 Drawing Sheets

(51) Int. Cl.
*G06Q 10/10* (2012.01)
*G06Q 50/00* (2012.01)
*H04M 1/725* (2006.01)
*H04W 4/029* (2018.01)
*H04M 1/2745* (2006.01)

(52) U.S. Cl.
CPC ... *H04M 1/72552* (2013.01); *H04M 1/72555* (2013.01); *H04M 1/72583* (2013.01); *H04W 4/029* (2018.02); *H04M 1/27455* (2013.01); *H04M 1/274583* (2013.01); *H04M 2250/22* (2013.01); *H04M 2250/64* (2013.01)

(58) Field of Classification Search
CPC ........... G06F 17/30867; G06F 21/6245; G06F 3/0484; G06F 17/30321; G06F 17/30345; G06F 17/30575; G06F 19/3406; G06F 21/606; G06F 2203/04803
See application file for complete search history.

(56) References Cited

U.S. PATENT DOCUMENTS

| | | | |
|---|---|---|---|
| 8,965,844 | B2 | 2/2015 | Jin et al. |
| 9,060,034 | B2 | 6/2015 | Black et al. |
| 2002/0160817 | A1 | 10/2002 | Salmimaa et al. |
| 2004/0155908 | A1 | 8/2004 | Wagner |
| 2006/0031489 | A1* | 2/2006 | Marcjan .................. 709/225 |
| 2008/0040354 | A1 | 2/2008 | Ray et al. |
| 2009/0125588 | A1 | 5/2009 | Black et al. |
| 2009/0274286 | A1* | 11/2009 | O'Shaughnessy et al. ................. 379/201.12 |
| 2010/0159909 | A1 | 6/2010 | Stifelman |
| 2011/0106911 | A1 | 5/2011 | Sung et al. |
| 2011/0117898 | A1 | 5/2011 | Pereira et al. |
| 2011/0218996 | A1 | 9/2011 | Jin et al. |
| 2011/0219312 | A1 | 9/2011 | Kim et al. |
| 2012/0110064 | A1 | 5/2012 | Chen et al. |
| 2012/0260188 | A1* | 10/2012 | Park et al. ................... 715/739 |
| 2012/0269185 | A1* | 10/2012 | Castleman .......... H04M 7/0027 370/352 |
| 2013/0205219 | A1* | 8/2013 | Moha .................. G06F 3/04842 715/748 |
| 2014/0006591 | A1* | 1/2014 | Davis ........................... 709/224 |
| 2016/0373445 | A1* | 12/2016 | Hayton ............... H04L 63/0815 |

FOREIGN PATENT DOCUMENTS

| | | |
|---|---|---|
| CN | 102404638 A | 4/2012 |
| EP | 1 465 389 A2 | 10/2004 |
| EP | 1 465 392 A2 | 10/2004 |
| JP | 2012-098888 A | 5/2012 |
| KR | 10-2011-0047703 A | 5/2011 |
| KR | 10-2011-0099473 A | 9/2011 |
| KR | 10-2011-0103611 A | 9/2011 |
| KR | 10-2012-0049455 A | 5/2012 |
| WO | 03/014978 A2 | 2/2003 |

OTHER PUBLICATIONS

A Look At Quick Search Box in Android I Android Central, Oct. 14, 2009, XP055397653, Retrieved from the Internet: URL:https://web.archive.org/web/20091014125427/https://www.androidcentral.com/look-quick-search-box-android [retrieved on Aug. 9, 2017].

* cited by examiner

FIG. 6C
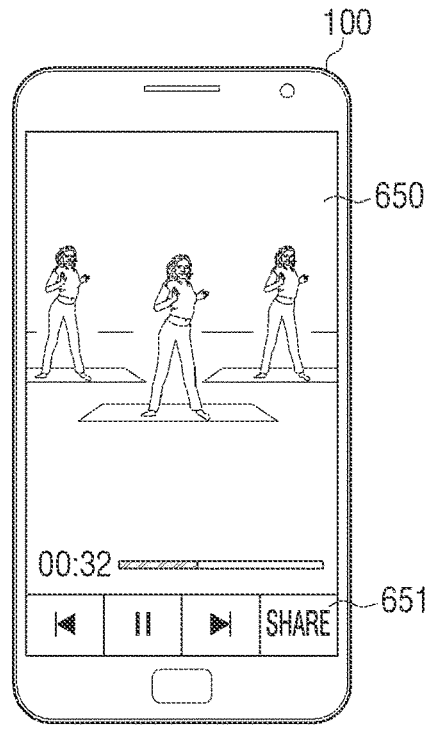
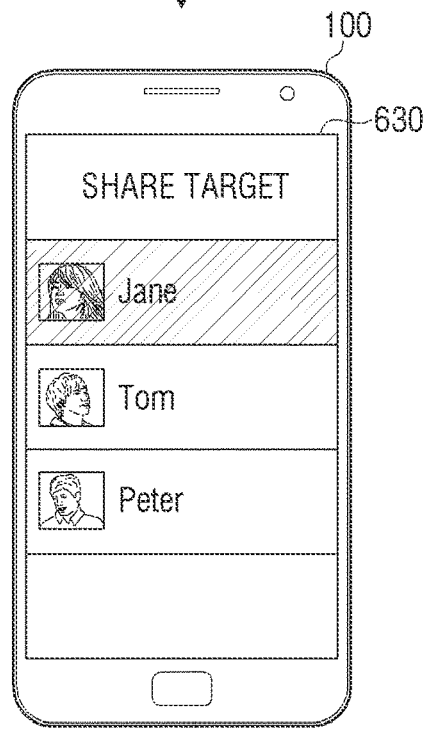  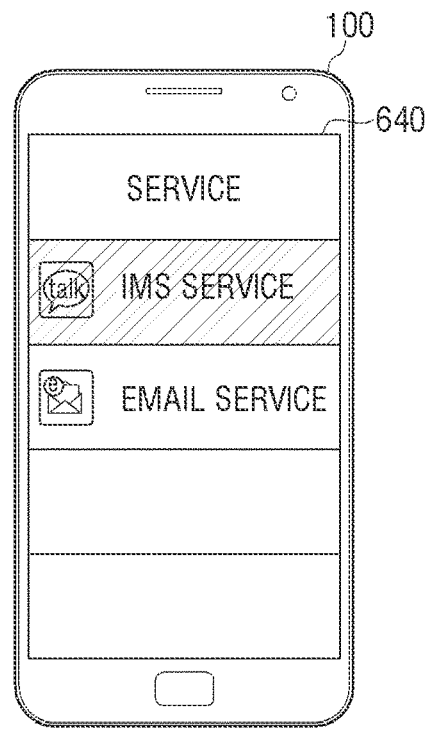

FIG. 19A

| Document Type | Place | Time | Share Target |
|---|---|---|---|
| Word Document | Company | 9:00am to 6:00pm | Person related to business |
| JPG Document | Home | Saturday, holiday, Sunday | Family, Friend |

FIG. 19B

| Document Type | Place | Time | Share Target |
|---|---|---|---|
| Word Document | Company | 9:00am to 12:00pm 1:00pm to 6:00pm | Person related to business |
| | | 12:00pm to 1:00pm | Family, Friend |
| JPG Document | Home | | Family, Friend |

DEVICE AND METHOD FOR SHARING CONTENT USING THE SAME

CROSS-REFERENCE TO RELATED APPLICATION(S)

This application claims the benefit under 35 U.S.C. § 119(a) of a Korean patent application filed on Aug. 22, 2012 in the Korean Intellectual Property Office and assigned Serial No. 10-2012-0091877, the entire disclosure of which is hereby incorporated by reference.

TECHNICAL FIELD

The present disclosure relates to a device and a method for sharing content using the same. More particularly, the present disclosure relates to a device for sharing content with an external device and a method for sharing content using the same.

BACKGROUND

Recently, with the development of an electronic technology, personal terminals have been actively developed, and as various kinds of content have been developed, users can enjoy the content anytime and anyplace. Accordingly, users are increasingly sharing content with others with ease.

Although users are increasingly sharing content through various kinds of devices, according to the current content sharing method, users should individually select content to be shared and opposite parties for content sharing, and this may cause the users to feel inconvenienced.

Therefore, a need exists for schemes for a user to share various kinds of content more conveniently and intuitively.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device which recommends an opposite party with whom a user intends to share content and a service used for sharing in accordance with a use history of the device, and a method for sharing content using the same.

In accordance with an aspect of the present disclosure, a method for sharing content of a device is provided. The method includes receiving, by an inputter, an input of a share command of a selected content, recommending at least one service to share the content among a plurality of services that are available in the device and a share target, and sharing, by a controller, the content with the share target selected through the selected service based on a selection input with respect to the at least one recommended service and the share target.

The recommending of at least one service may recommend the at least one service and the share target using context information related to an operation of the device.

The method may further include collecting and storing context information related to an interaction, if the device performs the interaction with an external device, wherein the recommending of at least one service recommends the at least one service and the share target based on the stored context information.

The context information may include at least one of information on the external device that performs the interaction with the device, time information when the interaction is performed, information on the content that is transmitted and received in the interaction process, information on the service through which the interaction is performed, or information on a position where the interaction is performed.

The recommending of at least one service may recommend at least one of the external devices having a history in which the interaction is performed, which has recently performed the interaction with the device, or in which the number of times the external device performs the interaction is equal to or greater than a certain number of times, as the share target.

The recommending of at least one service may recommend the at least one service, which has recently been used to perform the interaction with the external device, or in which the number of times the service performs the interaction is equal to or greater than a certain number of times, as the at least one service for sharing the selected content.

The sharing of the content may determine a communication method for sharing the content based on information on the selected content.

The method may further include displaying the at least one recommended service and a list of the share targets to receive the selection input.

The content may be content stored in the device, and the sharing of the content may transfer the content or link information related to the content to the selected share target through the selected service.

The content may be content stored in a server, and the sharing of the content may give the selected share target authorization to access the content stored in the server.

The recommending of at least one service may recommend the at least one service to share the content among the plurality of services that are available in the device and the share target based on situation information at a time when the share command is input.

The method may further include determining the situation information based on at least one of a kind of the selected content, the time when the share command is input, or a position of the device.

The recommending of at least one service may extract the at least one service to match the determined situation information and the share target based on information on the at least one service to share the selected content and the share target for the situation information, and recommend the at least one service and the share target extracted.

In accordance with another aspect of the present disclosure, a device is provided. The device includes an inputter configured to receive an input of a share command of a selected content, a display configured to display a list for recommending at least one service to share the selected content among a plurality of services that are available in the device and a share target, and a controller configured to share the content with the share target selected through the selected service based on a selection input with respect to the at least one recommended service and the share target.

The device may further include a memory configured to store context information related to an operation of the device, wherein the controller is further configured to recommend the at least one service and the share target using the context information.

The device may further include a communicator configured to perform communication with an external device, wherein the controller is further configured to collect and store context information related to an interaction in the memory, if the device performs the interaction with the external device, and to recommend the at least one service and the share target based on the stored context information.

The context information may include at least one of information on the external device that performs the interaction with the device, time information when the interaction is performed, information on the content that is transmitted and received in the interaction process, information on the service through which the interaction is performed, or information on a position where the interaction is performed.

The controller may be further configured to recommend at least one of the external devices having a history in which the interaction is performed, which has recently performed the interaction with the device, or in which the number of times the external device performs the interaction is equal to or greater than a certain number of times, as the share target.

The controller may be further configured to recommend the at least one service, which has recently been used to perform the interaction with the external device, or in which the number of times the service performs the interaction is equal to or greater than a certain number of times, as the at least one service to share the selected content.

The controller may be further configured to determine a communication method for sharing the content based on information on the selected content.

The device may further include a communicator configured to perform communication with the external device that is selected as the share target, wherein the controller is further configured to control the communicator to transfer the content or link information related to the content to the selected share target through the selected service.

The device may further include a communicator configured to perform communication with a server, wherein the controller is further configured to give the selected share target authorization to access the content stored in the server.

The controller is further configured to recommend the at least one service to share the content among the plurality of services that are available in the device and the share target based on situation information at a time when the share command is input.

The controller may be further configured to determine the situation information based on at least one of a kind of the selected content, the time when the share command is input, or a position of the device.

The device may further include a memory configured to store the at least one service to share the selected content and the share target, wherein the controller is further configured to extract the at least one service to match the determined situation information and the share target based on the stored information, and to recommend the at least one service and the share target extracted.

According to various embodiments of the present disclosure as described above, the device can automatically recommend the service to share the content and the share target for content sharing. Accordingly, user convenience can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, 7, 8, 9, 10, 11, 12, 13A, 13B, 14, 15, 16, 17, 18A, 18B, 19A, 19B, 20, and 21 are diagrams illustrating a method for sharing content according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
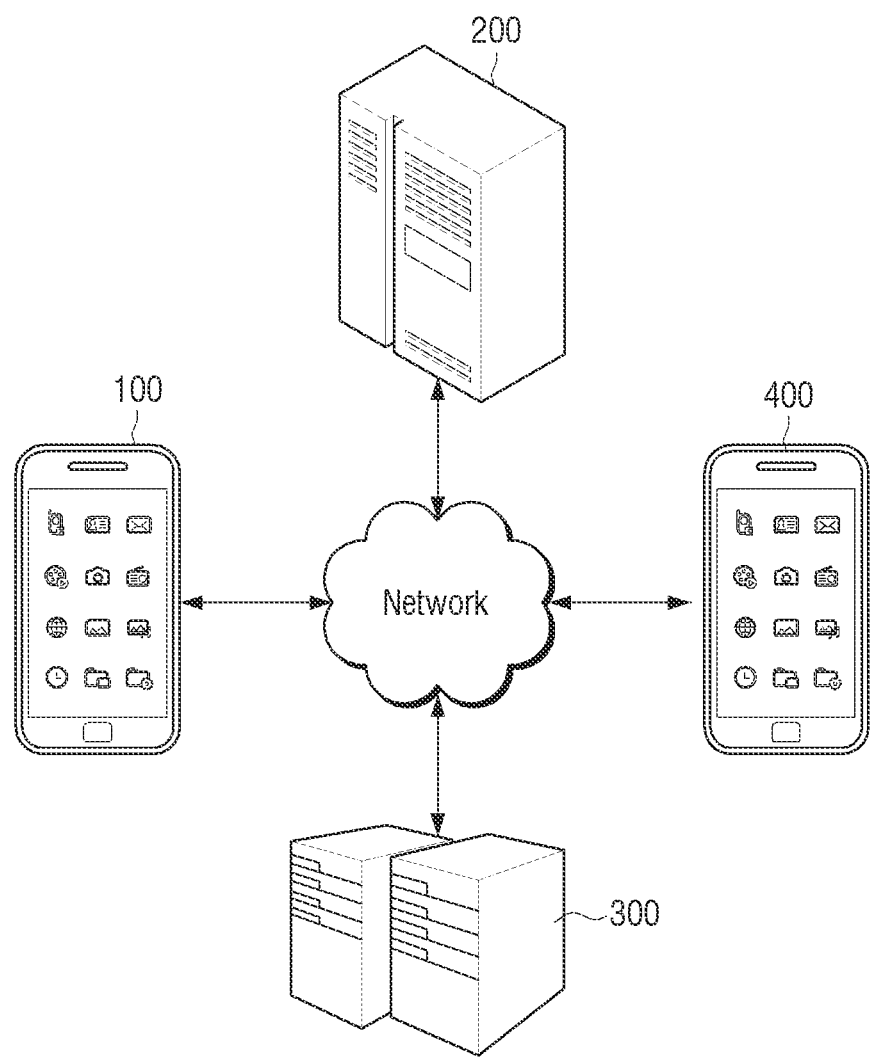
FIG. 1 is a diagram illustrating an implementation of a content sharing system according to an embodiment of the present disclosure.

FIG. 1 is a diagram illustrating an implementation of a content sharing system according to an embodiment of the present disclosure.

Referring to FIG. 1, a content sharing system may include a device 100, a first server 200, a second server 300, and a share target device 400. The device 100 and the share target device 400 may be portable phones, such as smart phones, as illustrated in FIG. 1. However, this is merely an example and the devices may be implemented by various electronic devices, such as a smart TV, a desktop Personal Computer (PC), a notebook PC, a Personal Digital Assistant (PDA), a navigation, and the like.

The device 100 may share content with the share target device 400. Here, the content includes images, moving images, text, music, and the like.

Specifically, the device 100 may recommend at least one of a service to be able to share content, a share target for content sharing, or content to be shared based on context information or situation information of the device 100, and may share the content with the share target device 400 based on a user's selection command.

As an example, if content to be shared is selected, the device 100 may recommend at least one service to share the selected content among a plurality of services that are available in the device 100 and at least one share target, and may share the content with the share target selected through the selected service according to the user's selection command.

On the other hand, the device can share the content in various methods with the share target device 400.

As an example, the device 100 may transfer at least one of the content and link information of the content to the share target device 400 through the service that can share the content.

On the other hand, the device 100 may operate to enable another user to access the content stored in the first server 200 through a user account to share the content stored in the first server 200 with the other user.

For example, the device 100 may give authorization to access the content to the other user's account so that the other user can access the content stored in the first server 200 through the user account of the device 100. Accordingly, the other user may log in to the first server 200 through the other user's account using the share target device 400, and receive the content stored in the first server 200 through the user account of the device 100.

The first server 200 may be implemented to store the content. In this case, the first server 200 can store the content by user accounts. For example, the user can log in to the first server 200 with the user's account using the device 100 and upload or download the content.

Here, the first server 200 may be implemented by a Social Networking Server (SNS) or a cloud server. Further, the first server 200 may store not only the content but also users' personal information, extending from a text type simple memo to Personal Information Management System (PIMS) information, such as an anniversary day, a name card, an appointment, a scheduler, an address book, a calendar, a calculator, accounts, and the like.

The second server 300 is a network server that provides various services. For example, the second server 300 may provide services, such as an email, a Short Message Service (SMS), an Instant Message Service (IMS), a Voice over Internet Protocol (VoIP), and the like.

Accordingly, the device 100 can share the content with the share target device 400 through the second server 300. For example, in a case of an email service, the device 100 may transfer the content or link information of the content to the user email account. Further, in a case of an IMS, the device 100 may transfer the content or link information of the content to a phone number matching the share target device 400.

The share target device 400 is an electronic device that can share the content with the device 100, and can share the content with the device 100 in various methods.

For example, the share target device 400 may receive the content and the link information of the content from the device 100. As another example, a user of the share target device 400 may access the first server 200 with the user's account and receive the content stored in the user account of the device 100.

Figure 2:
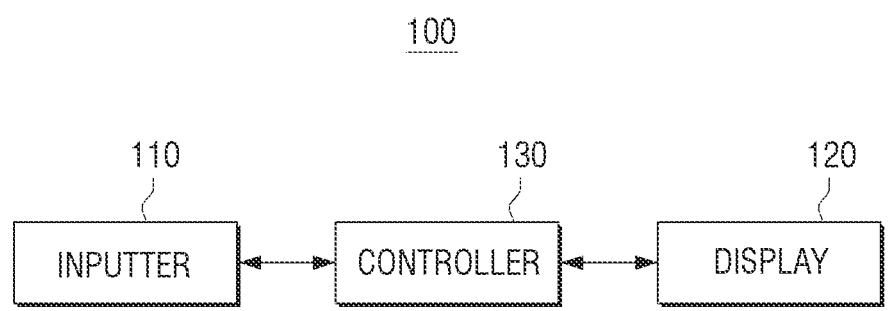
FIG. 2 is a block diagram illustrating a configuration of a device according to an embodiment of the present disclosure.

FIG. 2 is a block diagram illustrating a configuration of a device according to an embodiment of the present disclosure.

Referring to FIG. 2, the device 100 includes an inputter 110, a display 120, and a controller 130.

The inputter receives various user commands. More particularly, the inputter 110 may receive various user commands for sharing the content.

For this, the inputter 110 may be implemented by a keypad or a touch screen which is provided with various kinds of function keys, numeral keys, special keys, and character keys.

The display 120 may display various screens that can be provided by the device 100. More particularly, the display 120 may display content lists and various kinds of User Interface (UI) screens related to content sharing.

On the other hand, the display 120 may be implemented in a touch screen type having a mutual layer structure with a touch pad to display various screens and to serve as the inputter 110 for receiving an input of a user command. In this case, the touch screen may be implemented to detect not only the touch input position and area but also the touch pressure.

The controller 130 may be implemented by a Central Processing Unit (CPU) and control the whole operation of the device. More particularly, the controller 130 may operate to perform different functions depending on whether a share command for the selected content is input, whether a share command for the selected external device is input, or whether a share command for the selected user is input.

Hereinafter, functions performed in the controller 130 will be described by operations.

In a Case where a Share Command is Input with Respect to Content

A case where a share command is input with respect to content means a case where a user selects content to be shared and inputs a share command with respect to the selected content. As described above, if the content to be shared is specified, the device 100 may recommend at least one service to share the content and at least one share target.

For this, the display 120 may display a list of content stored in the device 100 or stored in the first server 200, and the inputter 110 may receive an input of a command for selecting the content to be shared or a share command for the selected content.

If the share command is input, the display 120 may display a list for recommending at least one sharable service related to the selected content and at least one share target. Specifically, the controller 130 may control the display 120 to display a list for recommending at least one service for sharing the selected content among the plurality of services that can be used in the device 100 and the share target.

Here, the service may be one of various types of communication services for providing means for the device 100 to share the selected content with the share target. For example, the service may be implemented in an application form that is software that the user can directly use on the Operating System (OS), but is not limited thereto. Further, the application may be provided in an icon interface form that corresponds to the corresponding application on the screen of the display 120, but is not limited thereto.

Further, the share target may include another device for sharing the selected content among an external device that can communicate with the device 100 and an external device, such as a server. Here, the server may include the first server 200 and the second server 300.

On the other hand, the controller 130 may recommend at least one service and at least one share target using context information. Here, the context information is information that is generated in relation to various operations of the device 100, and may be pre-stored in the device 100, but is not limited thereto.

For example, the context information may be received from the first server 200. In this case, if a share command for the content is input, the controller 130 may request the first server 200 to transfer the context information, and receive the context information from the first server 200. For this, the device 100 may be provided with a communication module (not illustrated) that can perform communication with the first server 200 through a network, such as $3^{rd}$ Generation (3G), the $3^{rd}$ Generation Partnership Project (3GPP), the Long Term Evolution (LTE), or the Internet.

Specifically, if the device 100 performs an interaction with the external device, the context information may include various kinds of information related to this. Here, the external device may include another device, the first server 200, and the second server 300.

Further, the interaction means all actions that the device 100 performs including communication and information sharing with the external device. For example, the interaction may include all actions, such as transmission/reception of messages with another device through SMS or IMS, connection to the corresponding server through the service that can connect to the first server 200, and uploading/downloading of the content after connection to the first server 200. In addition, the interaction may further include transfer of the content to an email account through an email service and accessing the email account to confirm the received email. The interaction may include all share interactions that are performed for the device 100 to share information with the external device.

Accordingly, the context information may include at least one of information on the external device that performs the interaction with the device 100, time information when the interaction is performed, position information where the interaction is performed, information on the content that is transferred during the interaction process, or information on the service through which the interaction is performed.

Specifically, the information on the external device that performs the interaction with the device 100 may include a user name of another device and a phone number matching the other device, if the external device is the other device, while the information on the external device may include a kind of the server with which the interaction is performed and account information with which the interaction is performed, if the external device is the server.

Further, the time information when the interaction is performed may include the number of interactions by devices, time when a call is performed with another device, a message transmission/reception time, and content transmission/reception time, if the external device is the other device, while the time information may include the number of interactions by servers, time when connection to the server is performed, and time when the content is uploaded or downloaded after connection to the server is performed, if the external device is the server.

The position information where the interaction is performed may include Global Positing System (GPS) information on a place where the device 100 performs an interaction with another device or the server, an Internet Protocol (IP) address to which the device 100 connects to a network to perform the interaction with another device or the server, and information on the service that is used for the interaction of the corresponding position information.

Further, the information on the content that is transmitted/received in the interaction process may include information on the kind and the size of the content that is transmitted/received through another device or the server.

Further, the information on the service through which the interaction is performed may include information on the kind of the service through which a call with another device is performed or a message or content is transmitted/received and time when the service is executed, if the external device is the other device, and may include information on the kind of the service that is used to connect to the server and time when the service is executed, if the external service is the server.

In addition, the context information may include information related to the operation performed by the device 100. Here, the operation that is performed by the device 100 may include generation of the content and execution of the content.

For example, if the device 100 generates the content, the context information may include information on the kind, size, and generation time of the generated content, and if the device 100 reproduces the content, the context information may include information on the number of reproductions and reproduction time.

On the other hand, the controller 130 may recommend at least one share target for sharing the selected content using the context information.

Specifically, the controller 130 determines if there is an external device that satisfies certain conditions among external devices having a history in which they perform the interaction. Thereafter, the controller 130 may recommend the share target by controlling the display 120 to display the list of the determined external device.

Here, the certain conditions may include various conditions for classifying the external device based on the context information, such as, if the interaction with the device 100 has recently been performed, if the number of times the interaction is formed is high, if there is a history in which the interaction is performed when the device 100 is present at the same position as the current position of the device 100, if there is a history in which the interaction with the device 100 is performed to transmit/receive the content of the same type as the selected content, or if there is a history in which the interaction with the device 100 is performed at the same time as the time when the content share command is input.

For example, the controller 130 may operate to recommend at least one of the external devices having a history in which the interaction is performed, which has recently performed the interaction with the device 100, or in which the number of times the external device performs the interaction is equal to or greater than a certain number of times, as the share target. Here, the term "recently" may mean the time that is within a certain time from the current time (which may be applied in the same manner in the following description).

For example, the controller 130 may determine other devices, which have recently performed a call or in which the number of times the devices perform the call is equal to or greater than a certain number of times, among the external devices having a history in which the interaction is performed based on a call history with the other devices, and may display a list of the determined other devices through the display 120.

Further, the controller 130 may determine other devices, which have recently performed message transmission/reception or in which the number of times the devices performs the message transmission is equal to or greater than a certain number of times, among the external devices having a history in which the interaction is performed based on a message transmission/reception history with the other devices, and may display a list of the determined other devices through the display 120.

In addition, the controller 130 may recommend the first server 200 or the second server 300 as the share target based on a connection time of the first server 200 or the second server 300, time when the content is uploaded to the first server 200 or the second server 300, and time when the content is downloaded from the first server 200 or the second server 300.

Specifically, the controller 130 may display, through the display 120, a list of the first server 200 and the second server 300, having recently been connected or having recently uploaded or downloaded the content, based on the interaction history with the server. Further, the controller 130 may display, through the display 120, a list of servers, in which the number of connections, the number of uploads, and the number of downloads are equal to or greater than certain numbers of times.

On the other hand, the controller 130 may recommend at least one service for sharing the selected content using the context information.

Specifically, the controller 130 determines services that satisfy the certain conditions among services having a history in which they are used for interaction using the context information. Further, the controller 130 may control the display 120 to display the list of the determined services to recommend the service.

Here, the certain conditions may include various conditions capable of classifying the services based on the context information, such as, if the service is used for the recently performed interaction, if the number of times the interaction is formed is high, if the service is used to transmit/receive the content at the same time as the time when the content share command is input, or if there is a history in which the service is used at the same position as the position where the content share command is input.

For example, the controller 130 may operate to recommend at least one service, which has recently been used to perform the interaction with the external device or in which the number of times the interaction is performed is equal to or greater than a certain number of times, as at least one service for sharing the selected content.

For example, the controller 130 may determine service providing applications, which have recently been driven to perform the interaction among a plurality of applications that can be executed in the device 100 based on the information on the service through which the interaction is performed, and display a list of the determined service providing applications through the display 120.

Further, the controller 130 may determine the service providing applications, in which the number of times the applications are driven to perform the interaction is equal to or greater than a certain number of times, among the plurality of applications that can be executed in the device 100 based on the information on the service through which the interaction is performed, and display a list of the determined service providing applications through the display 120.

On the other hand, the controller 130 may recommend the share targets by services. Specifically, the controller 130 may determine the share targets with which the content is shared by recommended services using the context information, and display a list for recommending the share targets by services through the display 120.

For example, it is assumed that a first service providing application and a second service providing application, in which the number of times they are driven is equal to or greater than a certain number of times, are recommended as a service for sharing the content.

In this case, based on the information on the message transmission/reception history, the controller 130 determines other devices which have recently transmitted/received the message through the first service providing application, and determines other devices which have recently transmitted/received the message through the second service providing application. Thereafter, the controller 130 controls the display 120 to display a list of the other devices determined by service providing applications to recommend the other devices that have recently transmitted/received the message by services as the share targets.

For example, based on the information on the message transmission/reception history, the controller 130 determines other devices which have transmitted/received the message over a certain number of times through the first service providing application, and determines other devices which have transmitted/received the message over the certain number of times through the second service providing application. Thereafter, the controller 130 may control the display 120 to display a list of the other devices determined by service providing applications to recommend the other devices, in which the number of times they transmit/receive the message by services is high, as the share targets.

In this case, the controller 130 may display icons that correspond to the recommended services on the list, and control the display 120 to display user names for the share targets recommended by services on the list to match the respective icons.

In the above-described embodiment, it is described that the share targets and services are recommended based on the time information when the interaction is performed and information on the service through which the interaction is performed, but are not limited thereto.

Specifically, the controller 130 may recommend the share targets and services based on information on the external devices that have performed the interaction.

For example, the controller 130 may determine if there is account information of associated users who form relations with the user of the device 100 on the SNS among account information of the first server 200 which performs the interaction with the device 100, and display a list of the account information of the associated users having a history in which the interaction is performed. In this case, the controller 130 may display icons for the services in which the account information is used on the list together with the account information.

Further, the controller 130 may recommend the share targets and services based on the position information in which the interaction is performed.

For example, the controller 130 may determine the external devices having a history in which they perform the interaction with the device 100 at the same position as that when the content share command is input based on the position information in which the interaction is performed, and display a list of the determined external devices. Further, the controller 130 may determine the services having a history in which they are used for the interaction at the same position as that when the content share command is input based on the position information in which the interaction is performed, and display a list of the determined external devices.

Further, the controller 130 may determine the share targets and services using a plurality of context information. For example, the controller 130 may recommend the share targets and services based on one piece of context information, and re-recommend the share targets and services through filtering the share targets and services recommended based on other context information.

For example, the controller 130 may determine at least one external device, of which the number of interactions is equal to or greater than the certain number of interactions, among the external devices having a history in which they perform the interaction with the device 100 based on the information on the number of interactions being performed. Thereafter, the controller 130 may determine the external devices which have recently performed the interaction among the external devices of which the number of interactions is equal to or greater than the certain number of interactions, and display a list of the external devices which have recently performed the interaction over the certain number of times.

In the same manner, the controller 130 determines at least one service, of which the number of uses for the interaction is equal to or greater than a certain number of uses, among a plurality of services that can be used in the device 100 based on the information on the number of drives of the service used for the interaction. Thereafter, the controller 130 may determine the at least one service which has recently been used for the interaction among the services of which the number of uses is equal to or greater than the certain number of uses, and display a list of the services which have recently been used over the certain number of times for the interaction.

Further, the controller 130 may recommend the share targets and services based on each of the plurality of context information.

For example, the controller 130 may display a first list for recommending the share targets based on first context information and a second list for recommending the share targets based on second context information that is different from the first context information, and recommend the share targets that correspond to different context information.

For example, the controller 130 may display a list of external devices, of which the number of interactions is equal to or greater than a certain number of interactions, among the plurality of external devices having a history in which they have performed the interaction, and a list of external devices, which have recently performed the interaction among the plurality of external devices having a history in which they have performed the interaction with the device 100 through the display 120. In the same manner, the controller 130 may display a list for recommending services using different kinds of context information through the display 120.

On the other hand, the controller 130 may display a list for recommending the share targets and services in various methods.

For example, the controller 130 may display at least one of service titles or icons for the services on the list. Further, the controller 130 may display at least one of a device name of the share target, a user name, a phone number, account information, an email address on the list, or the like. For this, the device 100 may pre-store the device name, the user name, the phone number, the account information, and the email address for each external device to match each other.

Further, the controller 130 may display the share targets and services on the list according to their priority.

For example, in a case of recommending the external devices, of which the number of interactions is equal to or greater than the certain number of interactions, as the share targets, the controller 130 may operate to arrange the external devices on the list in the order of their number of interactions. Further, in a case of recommending the external devices which have recently performed the interaction as the share targets, the controller 130 may operate to arrange the external devices on the list in the order of their time when the external devices perform the interaction. However, this is merely an example and the controller 130 may arrange the external device on the list in the reverse order of their number of interactions, or may arrange the external devices on the list in the reverse order of their time when the external devices perform the interaction.

In a case of recommending the services, of which the number of uses for the interaction is equal to or greater than the certain number of uses, the controller 130 may operate to arrange the services on the list in the order of their number of uses. Further, in a case of recommending the services which have recently been used to perform the interaction, the controller 130 may operate to arrange the services in the order of their time when the services are used for the interaction. However, this is merely an example and the controller 130 may arrange the services on the list in the reverse order of their number of uses, or may arrange the services on the list in the reverse order of their time when the services are used for the interaction.

On the other hand, the controller 130 operates to share the content with the share target through the selected service based on the user's selection input for at least one recommended service and the share targets. For this, the device 100 may include a communication module (not illustrated) that can perform communication with another device, the first server 200, and the second server 300 through a network, such as 3G, 3GPP, LTE, or the Internet.

Specifically, the controller 130 may share the content with the share target selected through the service selected on the list using different sharing methods according to the positions where the content is stored.

First, in a case of sharing the content stored in the device 100, the controller 130 may transfer the content or the link information of the content to the selected share target through the selected service. On the other hand, the link information may include a Uniform Resource Locator (URL) address for downloading the content itself or downloading in a streaming form.

For example, it is assumed that the service that is selected by a user on the list is a service that provides IMS and the selected share target is another device that has recently made a call. In this case, the controller 130 may connect to a mobile communication network through controlling a communication module (not illustrated), and may transfer the content to the other device that has recently made a call through the service that provides IMS.

Further, if the selected share target is account information, the controller 130 may transfer the content to a group account which includes the selected account information among group accounts that are pre-classified in the first server 200, so that users who belong to the corresponding group can download the content stored in the corresponding group account through accessing the server.

On the other hand, in a case of sharing the content that is stored in the first server 200 through the user account of the device 100, the controller 130 may give authorization to access the content stored in the first server 200 to another user's account.

For example, it is assumed that the content that is stored in the SNS server through the user account of the device 100 is selected. In this case, the controller 130 may transfer an authorization request for the corresponding account to the SNS server together with the account information of the other user's account information. Accordingly, the other user can download the content which the device 100 has given the authorization to access through accessing a web page according to the user account of the device 100 after the other user logs in to the SNS server through the other user's own account.

On the other hand, the authorization to access the content in the server may be set with respect to the user account. However, this is merely an example and according to circumstances, the authorization to access the content may be set with respect to the user terminal itself. Even in a case where the authorization to access the content is set with respect to the user account, it will be apparent to those skilled in the art that it is possible for the user to download the content by accessing through another device rather than the user's own device.

As described above, according to an embodiment of the present disclosure, the controller 130 may recommend at least one service to share the selected content and share targets that intend to share the selected content based on the context information. Accordingly, the at least one service and the share targets recommended as above may be changed according to a share history in which the user has performed the sharing through the device 100. For example, the controller 130 may recommend at least one device and share targets based on all the history in which the user transmits, receives, or transmits/receives information with external devices through the device 100.

In a Case where a Share Command is Input with Respect to a User

A case where a share command is input with respect to a user means a case where a user selects another user as a share target for sharing the content, and inputs a share command with respect to the selected share target. As described above, if the share target for sharing is specified, the device 100 may recommend at least one piece of content to be shared and at least one service to share the content.

For this, the device 100 may store information on another user's name, a phone number matching another user's device, and another user's email account through an application that provides a phone book service.

On the other hand, if the application is driven in accordance with a user command, the display 120 may display a list of other users' names or phone numbers matching other users' devices, and the inputter 110 may receive an input for selecting the share target on the list. Accordingly, the controller 130 may determine another user selected on the list as the share target.

However, according to circumstances, the share target may be selected using user information that is provided through a server rather than the device 100. For example, in a case where the user information is not stored in the phone book, but a specific server provides information on another user, the user may select the other user through accessing the corresponding server.

Thereafter, if a share command for the selected share target is input through the inputter 110, the display 120 may display a list for recommending at least one piece of sharable content that is related to the selected share target and at least one sharable service.

Specifically, the controller 130 may control the display 120 to display a list of at least one sharable service related to the selected share target and the content among a plurality of services that can be used through the device 100 and a plurality of pre-stored content. Here, the content may be content that is stored in the device 100 or content that is stored in an SNS server or a cloud server through the user account.

Here, the controller 130 may recommend at least one service using the context information. Since the context information has been described, the duplicate description thereof will be omitted. Further, since the service recommendation method that is performed by the controller 130 is the same as that in the embodiment for receiving an input of the share command for the content, the duplicate description thereof will be omitted.

However, the controller 130 may recommend at least one service having a history in which the service has been used for the share target selected among the plurality of services that can be used in the device 100 and the interaction.

For example, the controller 130 may display, through the display 120, a list of service providing applications having a history in which they are used for the selected share target and the interaction more than a certain number of times among the plurality of service providing applications that can be executed in the device 100.

Further, the controller 130 may display, through the display 120, a list of service providing applications having a history in which they have been recently used for the selected share target and the interaction among the plurality of service providing applications that can be executed in the device 100.

Further, the controller 130 may recommend a service for sharing the selected content based on the characteristic of the content selected to be shared.

For example, the controller 130 may recommend the service for sharing the selected content in consideration of the size of the selected content. For example, in a case where content having a relatively large capacity, such as a moving image, is selected, the controller 130 may display a list of services that can transfer the moving image, such as an email service, through the display 120.

On the other hand, the controller 130 may recommend at least one piece of content using the context information.

Specifically, the controller 130 determines the content that satisfies certain conditions among a plurality of pre-stored content using the context information. Thereafter, the controller 130 may recommend the content through displaying a list of determined content through the display 120. Here, the content may be content stored in the device 100 or content stored in the first server 200 through the user account of the device 100.

On the other hand, the certain conditions may include various conditions for classifying the content based on the context information, such as, if the content has recently been received, if the content has recently been transferred to an external device, if the transmission or reception frequency is equal to or greater than a certain number of times, if there is a history in which the content is transferred or received with respect to the selected share target, if there is not a history in which the content is transferred or received with respect to the selected share target, if the content is transferred or received at the same position as the current position of the device, if the content is transferred or received at the same time as the time when the content share command is input, if the number of reproductions is equal to or greater than a certain number of reproductions, and if the content has recently been generated.

For example, the controller 130 may recommend the recently transferred content through displaying the content that has recently been transferred to another device among a plurality of pre-stored content based on information related to the content transfer/reception history.

Further, the controller 130 may recommend the content having a large number of times the content is transferred and received through displaying a list of content having the number of times the content is transferred to or received from the first server 200, which is equal to or greater than a certain number of times, among the plurality of pre-stored content based on the information related to the content transfer/reception history.

In addition, the controller 130 may recommend the content, which has a large number of reproductions or which has recently been generated, through displaying a list of content, which have been reproduced more than a certain number of times, or which have recently been generated, among the plurality of pre-stored content based on the information related to the content itself.

However, the above-described embodiments are merely examples and it may also be possible to recommend the content that meets the certain conditions according to various kinds of context information.

On the other hand, the controller 130 may recommend the content based on the characteristic of the service selected as the service for sharing the content.

Specifically, the controller 130 may recommend the content having a size enough to be transferred through the selected service in consideration of the size of the content that can be transferred through the service selected by the user, on a service recommendation list.

For example, it is assumed that an application that provides the IMS is selected as the service for transferring the content to the share target. In this case, the controller 130 may display a list of content having a size that can be transferred through the IMS service among the plurality of pre-stored content through the display 120.

In this case, the controller 130 may recommend the content in combination with other context information. For example, in the above-described example, the controller 130 may determine the content recently received from the external device among the plurality of pre-stored content, and display, through the display 120, a list of content having the size that can be transferred through the IMS service among the recently received content.

On the other hand, the controller 130 may recommend the content by services. Specifically, the controller 130 may determine the content to be recommended by recommended services using the context information, and display a list for recommending the content by services through the display 120.

For example, it is assumed that a first service providing application and a second service providing application, in which the number of times they are driven is equal to or greater than a certain number of times, are recommended as a service for sharing the content.

In this case, based on the information on the content transmission/reception history, the controller 130 determines the content recently transferred through the first service providing application and the content recently transferred through the second service providing application. Thereafter, the controller 130 may recommend the recently transferred content by services through controlling the display 120 to display a list of content determined by service providing applications.

In this case, the controller 130 may display icons that correspond to the recommended services on the list, and display content titles to be shared through the respective recommended services on the list to match the respective icons.

Further, the controller 130 may recommend the service and the content in combination with the context information. For example, the controller 130 may recommend the service and the content based on one piece of context information, and finally recommend the service and the content through filtering the recommended service and content based on the other piece of context information.

For example, the controller 130 determines the content of which the number of reproductions is equal to or greater than a certain number of reproductions among the pre-stored content. Thereafter, the controller 130 may determine the content that has recently been received through the external device among the content of which the number of reproductions is equal to or greater than the certain number of reproductions, and display a list of the determined content through the display 120.

On the other hand, since the method for recommending the service in combination with the context information, which is performed by the controller 130, is the same as that according to the embodiment in which the share command for the content is input, the duplicate description thereof will be omitted.

Further, the controller 130 may recommend the service and the content based on a plurality of context information.

For example, the controller 130 may display a first list for recommending the content based on first context information and a second list for recommending the content based on second context information that is different from the first context information, and recommend the content corresponding to different context information.

For example, the controller 130 may control the display 120 to display a list of content, which have been transferred to the external devices more than a certain number of times among a plurality of pre-stored content and a list of content, which have been received from the external devices more than the certain number of times.

On the other hand, since the method for recommending the service in combination with different kinds of context information, which is performed by the controller 130, is the same as that according to the embodiment in which the share command for the content is input, the duplicate description thereof will be omitted.

On the other hand, the controller 130 may display the list for recommending the service and the content in various methods.

For example, the controller 130 may display at least one of service titles or icons for the services on the list. Further, the controller 130 may display titles of content on the list.

Further, the controller 130 may display the services and the content on the list according to their priority.

For example, in a case of recommending the content which has been reproduced more than a certain number of times, the controller 130 may operate to arrange the content on the list in the order of their number of reproductions. However, this is merely an example and the controller 130 may arrange the content in the reverse order of their number of reproductions.

On the other hand, since the method for displaying the service on the list according to the priority is the same as that according to the embodiment in which the share command for the content is input, the duplicate description thereof will be omitted.

On the other hand, the controller 130 may operate to share the content with the share target through the selected service based on the at least one recommended service and the user's selection input for the at least one piece of content. For this, the device 100 may include a communication module (not illustrated) that can perform communication with another device, the first server 200, and the second server 300 through a network, such as 3G, 3GPP, LTE, or the Internet.

Specifically, the controller 130 may transfer the content itself that is selected by the user or the link information related to the content to another user's device. On the other hand, since the method for sharing the content, which is performed by the controller 130, is the same as that according to the embodiment in which the share command for the content is input, the duplicate description thereof will be omitted.

As described above, according to an embodiment of the present disclosure, the controller 130 may recommend at least one piece of content to be shared with the share target and at least one service for sharing the content with the selected share target based on the context information. Accordingly, the at least one piece of recommended content and the at least one service may be changed according to the share history that the user has performed through the device 100. For example, the controller 130 may recommend at least one piece of content and at least one service based on all the history in which the user transmits, receives, or transmits/receives information with external devices through the device 100.

In a Case where a Share Command is Input with Respect to an External Device

A case where a share command is input with respect to an external device means a case where a user selects an external device as a share target for sharing the content, and inputs a share command with respect to the selected share target. Here, the external device may include a first server 200 that is connectable to the device 100, and the device 100 may pre-store account information of the first server 200 that is connectable to the device 100.

As described above, if the share target for sharing is specified, the device 100 may recommend at least one piece of content to be shared and at least one service to share the content.

For this, the display 120 may display a list of account information of the servers that are communicable with the device 100, and the inputter 110 may receive an input of a command for selecting the share target on the list. Accordingly, the controller 130 may determine the selected other user as the share target.

Thereafter, if a share command for the selected share target is input through the inputter 110, the display 120 may display a list for recommending at least one piece of sharable content that is related to the selected share target and at least one sharable service.

Specifically, the controller 130 may control the display 120 to display a list of at least one sharable service related to the selected share target and the content among a plurality of services that can be used through the device 100 and a plurality of content stored in the device. Here, the content may be content that is stored in the device 100 or content that is stored in the first server 200 through the user account.

On the other hand, the controller 130 may recommend at least one service and at least one piece of content using the context information. Since the method for recommending the service and the content using the context information is the same as that in a case where the share command is input for the user, the duplicate description thereof will be omitted.

Further, the controller 130 may operate to share the content with the share target through the selected service based on the user's selection input for the at least one service and the at least one piece of content recommended as above. For this, the device 100 may include a communication module (not illustrated) that can perform communication with another device, the first server 200, and the second server 300 through a network, such as 3G, 3GPP, LTE, or the Internet.

Specifically, the controller 130 may upload the content selected by the user or the link information related to the content to the account of the first server 200. On the other hand, since the method for sharing the content, which is performed by the controller 130, is the same as that according to the embodiment in which the share command for the user is input, the duplicate description thereof will be omitted.

As described above, according to an embodiment of the present disclosure, the controller 130 may recommend at least one piece of content to be shared with the selected share target and at least one service for sharing the content with the selected share target based on the context information. Accordingly, the at least one piece of recommended content and the at least one service may be changed according to the share history that the user has performed through the device 100. For example, the controller 130 may recommend at least one piece of content and at least one service based on all the history in which the user transmits, receives, or transmits/receives information with the external devices through the device 100.

In the above-described embodiments, it is described that all the context information related to the interaction is stored in the device 100, but this is merely an example.

For example, the device 100 may store the context information related to the interaction that occurs before a certain period based on the current time point. For example, the controller 130 may store the context information related to the interaction that occurs in one recent week or in one recent month. However, this is merely an example and the certain period may be variously changed, such as three recent months or six recent months.

Further, the controller 130 may operate to store the whole context information in a cloud server. For this, the controller 130 may control the communication module (not illustrated) to transfer the related context information to the cloud server when the device 100 performs the interaction with another device or the server.

In this case, the controller 130 may display, through the display 120, a list for primarily recommending at least one of a service, a share target, or a content based on the context information stored in the device 100.

Thereafter, the controller 130 may request the cloud server to recommend at least one of the service, the share target, or the content through the communication module (not illustrated), and receive the result of recommendation from the cloud server. In this case, the cloud server may recommend at least one of the service, the share target, or the content based on the pre-stored context information. At this time, the cloud server may recommend the service, the share target, and the content using the same method as that of the device 100. For example, the cloud server may determine the service, the share target, and the content that satisfy the certain conditions using the context information, and transfer information on the service, the share target, and the content as determined above to the device 100. For example, the cloud server may transfer a service title, a user name of another device, a phone number matching another device, a server name, server account information, a content title, and the like, to the device 100.

On the other hand, if the result of recommendation is received from the cloud server, the controller 130 may generate a list for recommending a service, a share target, and content using the result of recommendation, and display the generated list through the display 120. Accordingly, the list that has been displayed to primarily recommend the service, the share target, and the content may be updated by a new list.

For example, the controller 130 may primarily recommend the service, the share target, and the content using the context information related to the interaction occurring for a certain period, and finally recommend the service, the share target, and the content based on the context information related to all the interactions.

The reason why the recommendation of the service, the share target, and the content is separately performed by the cloud server is that the CPU performance and storage capacity of the cloud server is generally superior to the CPU performance and storage capacity of the device 100 that is implemented by a smart phone or a smart TV. For example, the cloud server, which has a relatively superior CPU performance and storage capacity, is made to store and process a large amount of context information.

Accordingly, in consideration of the CPU performance and storage capacity of the device 100, the controller 130 may store the context information for a certain period in the device 100 for recommendation, and make the cloud server to perform the storage of all the context information and the recommendation based on the context information.

In the above-described embodiment, it is described that the controller 130 recommends at least one service, share target, and content to be shared based on the context information. However, this is merely an example and it is also possible to perform recommendation in other methods.

Specifically, the controller 130 may recommend at least one service to share the selected content and the share target among the plurality of services that can be used in the device 100 based on the situation information of the device at a time when the share command is input.

Here, the situation information may be user's content sharing intention that is determined in collective consideration of information, such as a kind of the selected content, time when the share command is input, and a position of the device 100 at a time when the share command is input.

In order to determine the situation information, the controller 130 may use a sharing model. Here, the sharing model includes an algorithm that can provide different recommendation results according to input information.

Specifically, the controller 130 analyzes the situation information that corresponds to the input information. For example, if information is input on the kind of the content, the time when the share command is input, and the position of the device 100 at the time when the share command is input, the controller 130 may determine the situation information that corresponds to the respective information.

For example, if the selected content is a text, the controller 130 may determine that the user intends to share the content in relation to a business, and if the selected content is a moving image or an image, the controller 130 may determine that the user intends to share the content regardless of the business.

Further, the controller 130 outputs the corresponding recommendation result according to the analyzed situation information. For this, the device 100 may store information on at least one service to share the selected content by situation information and the share target, extract at least one service matching the determined situation information and the share target based on the stored information, and recommend the at least one service and the share target as extracted above.

For example, if it is determined to share the content in relation to the business, the controller 130 may recommend other users in relation to business as share targets, and recommend services that are used in the company among a plurality of services that can be used in the device 100 as services to share the content. Further, if it is determined to share the content having no relation to business, the controller 130 may recommend other users having no relation to business as share targets, and recommend other services except for the services that are used in the company among the plurality of services that can be used in the device 100 as services to share the content. Here, other users having no relation to business are users who are not related to the user on business, and may be family, friends, or acquaintances.

For this, the device 100 may store information on other users, such as a phone book, by groups (i.e., family, friends, acquaintances, companies, and the like). Here, information on other users may include information on other users' names, phone numbers matching other users' devices, email accounts, SNS accounts, and the like.

Accordingly, the controller 130 may determine other users stored in a company group as other users in relation to business and other users stored in other groups as other users having no relation to business using the information on other users stored by groups. Thereafter, the controller 130 may generate a list for recommending share targets using information on other users and display the list through the display 120.

Further, the device 100 may store information on service titles used in the company, the controller 130 may generate and display a list for recommending service used in the company through the display 120 using the information.

In the above-described example, it is described that the share targets and services are recommended according to the kinds of content, but this is merely one example.

For example, if a time when the share command is input is included in a user's business hours, the controller 130 may determine that the user intends to share the content in relation to the business, and recommend the share targets and the services in relation to the business. If the time when the share command is input is included in the user's non-business hours, the controller 130 may determine that the user intends to share content regardless of the business, and recommend the share targets and the services having no relation to the business.

For this, the device 100 may pre-store information on the user's business hours. Accordingly, if the time when the share command is input is included in the business hours, the controller 130 may display the list for recommending other users in relation to business as the share targets and the services that are used in the company through the display 120. On the other hand, if the time when the share command is input is not included in the business hours, the controller 130 may display the list for recommending other users having no relation to business as the share targets and other services except for the services that are used in the company through the display 120.

Further, if the device 100 is positioned in a user's business place at the time when the share command is input, the controller 130 may determine that the user intends to share content in relation to business, and recommend the share targets and the services in relation to business. Further, if the device 100 is positioned in a user's non-business place at the time when the share command is input, the controller 130 may determine that the user intends to share content having no relation to business, and recommend the share targets and the services having no relation to business.

For this, the device 100 may store position information of the user's business place. Here, the position information may include GPS information and an IP address of the user's business place.

Accordingly, if the device 100 is positioned in the user's business place at the time when the share command is input, the controller 130 may display, through the display 120, a list for recommending other users in relation to business as the share targets and the services that are used in the company. On the other hand, if the device 100 is positioned in the user's non-business place at the time when the share command is input, the controller 130 may display, through the display 120, a list for recommending other users having no relation to business as the share targets and other services except for the services that are used in the company.

In the above-described embodiment, it is described that the situation information is analyzed according to the kinds of content, but this is merely one example. In another example, the controller 130 may operate to analyze the situation information based on attributes of the content selected by the user and to output the corresponding result of recommendation according to the analyzed situation information. As an example, the attributes of the content may include security strength set in the content.

For example, if the security strength of the selected content is higher than a certain level, the controller 130 may determine that the user intends to share the content in relation to business, and recommend other users in relation to business as the share targets and the services that are used in the company.

Further, if the security strength of the selected content is lower than the certain level, the controller 130 may determine that the user intends to share the content having no relation to business, and recommend other users having no relation to business as the share targets and other services except for the services that are used in the company.

Further, the controller 130 may analyze the situation information of the information input in association with the first server 200.

Specifically, the controller 130 may recommend at least one service and share target to share the selected content based on schedule information stored in the first server 200. For this, the device 100 may include a communication module (not illustrated) that can communicate with the first server 200.

Here, the schedule information may include PIMS information. For example, if the share command for the selected content is input, the controller 130 may request the user's schedule information from the first server 200, and recommend the services and the share targets based on the characteristic of the time when the share command is input using the schedule information received from the server.

For example, if it is determined that a conference schedule is set in the time when the share command is input, the controller 130 may determine that the user intends to share the content in relation to business, and may recommend the share targets and the services related to business. For example, the controller 130 may display a list for recommending other users in relation to business and the services that are used in the company through the display 120.

In this case, the controller 130 may recommend the share targets and the services in additional consideration of the context information.

For example, if it is determined that the time when the share command is input is a wedding anniversary, the controller 130 may recommend another user stored in a phone book as a mate as the share target. In this case, the controller 130 may recommend the services based on the interaction history with the other user stored as the mate. For example, the controller 130 may recommend a service providing application of which the number of interactions is equal to or greater than a certain number of interactions among service providing applications that are used for the interaction with the other user stored as the mate.

In the above-described embodiment, it is described that the share targets and the services are recommended based on the user schedule information of the device 100, but this is merely an example.

In another example, if the first server 200 stores schedule information of other users, the controller 130 may receive the schedule information of other users from the first server 200, and may recommend the share targets and the services based on the schedule information of other users.

For example, if another user's conference schedule is set in the time when the share command is input, the controller 130 may determine that another user intends to share the content in relation to business, and recommend the content and the services related to business. In this case, the share target may be another user for the schedule information.

Further, if a plurality of information is input, the controller 130 may determine the user's content sharing intention in collective consideration of the situation information analyzed according to the information.

For example, if the situation information that is analyzed according to the input information is the same, the controller 130 determines the content sharing intention based on the common situation information. For example, if the device 100 is positioned in a business place at the time when the share command is input and the content to be shared is a text, the controller 130 may determine that the user intends to share the content in relation to business, and recommend other users in relation to business as the share targets and the services that are used in the company.

However, if the analyzed situation information is not the same, the controller 130 may select one of different pieces of situation information based on weight values given to the respective pieces of information. Here, the weight values may be set and changed by the user.

For example, it is assumed that the device 100 is positioned in the business place at the time when the share command is input, but the content to be shared is a moving image. In this case, if a relatively high weight value is given to position information of the device 100, the controller 130 may determine that the user intends to share the content in relation to business, and recommend other users related to business as the share targets and the services that are used in the company.

On the other hand, the controller 130 may operate to display the result of recommendation through the display 110.

Specifically, the controller 130 may display at least one of titles of the recommended services or icons corresponding to the services, and may display at least one of the titles of the recommended content or thumbnail images corresponding to the content. Further, the controller 130 may operate to display titles of the recommended share targets, phone numbers, and account information.

For example, if other users related to business are recommended as the share targets, the controller 130 may display names of other users grouped into a group in relation to business in the pre-stored phone book and the phone numbers.

However, if other users grouped into the group in relation to business do not exist in the pre-stored phone book, the controller 130 may analyze names of other users existing in the phone book and extract other users in relation to business.

Specifically, the controller 130 may compare names of other users existing in texts related to a job classification and the phone book with each other, and may extract other users having names of which the texts related to the job classification exist as other users in relation to business. For example, the device 100 may pre-store texts, such as "staff", "deputy manager", "manager", "deputy general manager", and "general manager", and the controller 130 may extract the names of which the texts exist in the phone book, and recommend the extracted names as the share targets in relation to business.

Further, if other users in relation to business are recommended as the share targets, the controller 130 may receive and display information of other users in relation to business.

Specifically, the controller 130 may connect to the first server 200 through the user account, request names, phone numbers, and account information of persons classified into a category in relation to business among related users who are in relation to the user of the device 100 on the social network service, and receive such information from the first server 200. For this, the device 100 may be provided with a communication module (not illustrated) for performing communication with the first server 200.

Further, the controller 130 may re-recommend the recommendation results based on the situation information through filtering the recommendation results based on the context information.

Specifically, the controller 130 may filter the recommendation results based on the situation information, based on the time when the interaction is performed, the position where the interaction is performed, and service information to perform the interaction.

For example, the controller 130 may display the share targets, which have recently performed the interaction or of which the number of interactions is equal to or greater than the certain number of interactions, among the recommended share targets based on the situation information. Further, the controller 130 may display the share targets, which have recently performed the interaction more than the certain number of times, among the recommended share targets.

Further, controller 130 may display the share targets having a history in which the share targets perform the interaction at the same position as the position information of the device 100 at the time when the share command is input among the recommended share targets.

Further, controller 130 may display the share targets having a history in which the share targets have recently performed the interaction at the same position as the position information of the device 100 at the time when the share command is input among the recommended share targets. For example, in the above-described example, if the device 100 is positioned at a business place at the time when the share command is input, the controller 130 may display the share targets that have recently performed the interaction among the share targets that have performed the interaction when the device 100 is positioned in the business place.

In the above-described embodiment, it is described that the recommended share targets are filtered based on the situation information, but the filtering may also be applied to the services in the same manner.

As described above, the controller 130 may display the results of recommendation through the display 120. At this time, the controller 130 may give a priority according to the context information to the results of recommendation according to the situation information to display the results of recommendation in the order of their priority.

Specifically, the controller 130 may give the priority to the results of recommendation based on the time when the interaction is performed, the position where the interaction is performed, and service information to perform the interaction, and display the results of recommendation in the order of their priority. For example, the controller 130 may display the share targets recommended based on the situation information in the order of their time when they perform the interactions or in the order of their number of interactions.

In the above-described embodiment, it is described that the share targets recommended based on the situation information are displayed in the order of their priority, but such display order may also be applied to the services in the same manner.

Further, the controller 130 may be learned based on the user selection with respect to the results of recommendation. Specifically, the controller 130 may update the situation information that matches the input information based on the user selection with respect to the results of the recommendation.

For example, if the share command is input in a state where the device 100 is positioned in the business place in business hours, the controller 130 recommends other users related to business as the share targets.

However, if the user deletes the list of the recommended share targets and selects other users having no relation to the share targets recommended on the whole list, the controller 130 may determine the attributes of other selected users, and store the determined attributes of other users to match the time when the share command is input. Here, the user attributes may differ according to the groups to which the user belongs. For example, the controller 130 may determine which non-business group the user belongs to, that is, whether the user belongs to a family category, a friend category, or an acquaintance category, and store the results of determination to match the time when the share command is input.

Thereafter, if the share command is re-input in the same state, the controller 130 may recommend the share targets that are different from the existing share targets based on the pre-stored user attribute information. For example, if the share command is input at the same time in the user's business place, the controller 130 may recommend other users having no relation to business as the share targets based on the user attributes stored at the corresponding time. In the above-described example, if the selected user belongs to a family category, the controller 130 may recommend other users who belong to the family category as the share target even if the share command is input at the business place within the business hours.

Although it is described that the share targets are recommended based on the pre-stored user attributes in the above-described embodiment, this is merely an example and such recommendation can also be applied to the services to share the content.

For example, if the share command is input in a state where the device 100 is positioned in the business place within the business hours, the controller 130 recommends the services that are used in the company.

However, if the user deletes the list of the recommended services and selects other services having no relation to the services recommended on the whole list, the controller 130 may store the selected services to match the input time.

Thereafter, if the share command is re-input in the same state, the controller 130 may recommend services that are different from the existing services based on the pre-stored service information. For example, if the share command for the content is input at the same time at the user's business place, the controller 130 may recommend other services except for the services that are used in the company. For example, if the service selected in the above-described examples belongs to a text message service, the sharing model may recommend the text message service as a service for sharing the content even if the share command is input in the business place within the business hours.

Figure 3:
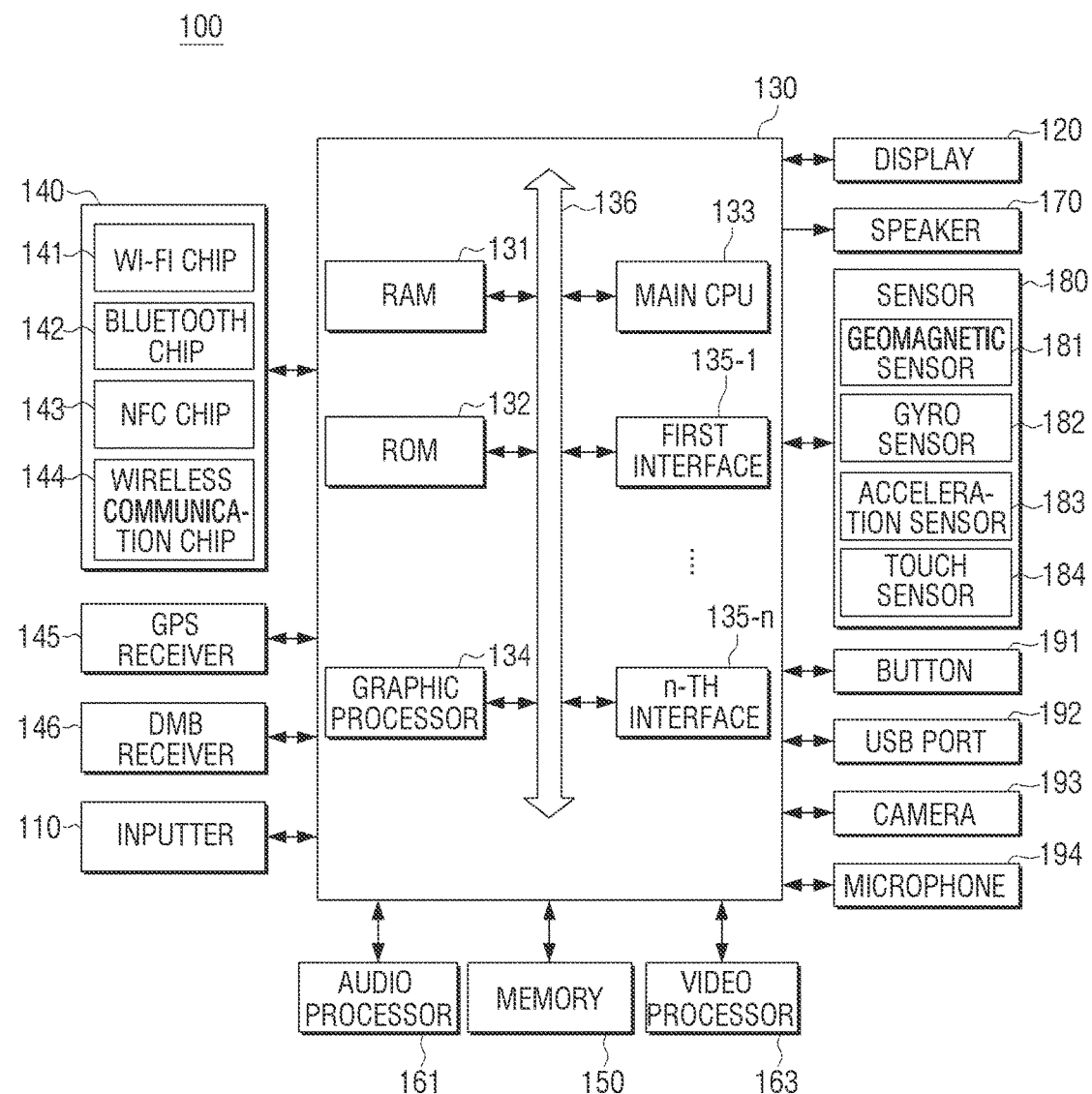
FIG. 3 is a block diagram illustrating a configuration of a device according to an embodiment of the present disclosure.

FIG. 3 is a block diagram illustrating a configuration of a device according to an embodiment of the present disclosure.

Referring to FIG. 3, the device 100 includes a communicator 140, a GPS receiver 145, a Digital Multimedia Broadcasting (DMB) receiver 146, a memory 150, an audio processor 161, a video processor 163, a speaker 170, a sensor 180, a button 191, a Universal Serial Bus (USB) port 192, a camera 193, and a microphone 194 in addition to the constituent elements illustrated in FIG. 2.

The communicator 140 performs communication with an external device. Here, the external device may include the first server 200, the second server 300, and another device. For this, the communicator 140 includes hardware according to various communication types, such as a Wi-Fi chip 141, a Bluetooth chip 142, a Near Field Communication (NFC) chip 143, and a wireless communication chip 144. These chips may be integrated into one chip, or may be used as separate chips as shown in FIG. 3.

More particularly, the communicator 140 may perform an interaction with the external device. In a case where the device 100 performs the interaction with the external device, the controller 130 may collect context information related to the interaction information and store the collected context information in the memory 150.

Specifically, the controller 130 may monitor interactions occurring by services that can be provided by the device 100, and collect and store in the memory 150 information on the external devices that perform the interactions, time information when the interaction is performed, information on the content that is transmitted and received in the interaction process, and information on the service through which the interaction is performed. In addition, the controller 130 may operate to transfer the context information that occurs according to the interaction with the external device to the first server 200 through the communicator 140.

Further, the controller 130 may display a list for recommending at least one of services, share targets, or content through the display 120 based on the context information.

On the other hand, the communicator 140 may perform communication with the external device that is selected as the share target, and if the content stored in the memory 150 is selected, the controller 130 may control the communicator 140 to transfer the content or link information related to the content to the selected share target through the selected service.

Further, the communicator 140 may perform communication with the first server 200 and the second server 300. If the content stored in the server is selected, the controller 130 may give authorization to access the content stored in the server with respect to the selected share target.

Since the operation that is performed by the controller 130 to share the content has been described with reference to FIG. 2, the description thereof will be omitted.

For this, the communicator 140 is provided with the Wi-Fi chip 141, the Bluetooth chip 142, and the NFC chip 143, and performs communication in the Wi-Fi method, Bluetooth method, and the NFC method.

Among them, the NFC chip 143 means a chip that operates in the NFC method that uses 13.56 MHz band among various Radio Frequency-IDentifier (RF-ID) frequency bands, such as 135 kHz, 13.56 MHz, 433 MHz, 860 to 960 MHz, and 2.45 GHz. In a case of using the NFC chip 143, a share target device 400 should be provided with an NFC reader. Accordingly, if the user moves the device 100 or the share target device 400 and positions them in a communicable range (about 10 cm), the content recorded in the NFC chip 143 is transferred to the share target device 400.

On the other hand, in a case of using the Wi-Fi chip 141 or the Bluetooth chip 142, the chip 141 or 142 is connected to the share target device 400 through first transmission/reception of various kinds of connection information with the share target device 400, and performs communication through a network.

In addition, the wireless communication chip 144 may perform various types of wireless communication using a mobile communication network, such as 3G, 4G, or the Internet. Specifically, the wireless communication chip 144 may connect to the mobile communication network according to various mobile communication standards, such as 3G, 3GPP, and LTE, and perform communication with the first server 200 and the share target device 400.

The GPS receiver 145 is a constituent element which receives a GPS signal from a GPS satellite, and calculates the current position of the device 100. The controller 130 may determine the external devices, with which the device 100 performs the interaction at the same position as that when the content share command is input, and the services used for the interaction when the content share command is input among the external devices having a history in which they perform the interaction with the device 100, using the calculated GPS information, and recommend the determined external devices and services.

The DMB receiver 146 is a constituent element which receives and processes a DMB signal.

On the other hand, the controller 130 may determine the communication method for sharing the content based on information on the selected content.

Specifically, the controller 130 may control the communicator 140 to perform the communication with the external device according to the communication method that corresponds to the size of the selected content. For example, if the size of the content is larger than a certain size, the controller 130 may share the content with the share target according to a wireless communication protocol, such as Wi-Fi, while if the size of the content is smaller than the certain size, the controller 130 may control the communicator 140 to share the content with the share target through accessing the mobile communication network according to the mobile communication standard, such as 3G or LTE.

The memory 150 may store various kinds of information used to operate the device 100. More particularly, the memory 150 may store context information related to the operation of the device 100, and the controller 130 may operate to recommend at least one service, share targets, and content using the context information. Since this has been described, the duplicate description thereof will be omitted.

As described above, the controller 130 may recommend the share targets and the services based on the situation information. For this, the memory 150 may store information on at least one service and share targets to share the selected content by situation information. Further, the memory 150 may further store information on the user's business hours and information on the business place.

The memory 150 may include a storage medium of at least one of a flash memory type, a hard disk type, a multimedia card micro type, a card type memory (e.g., a Secure Digital (SD) or an XD memory), a Random Access Memory (RAM), a Read Only Memory (ROM), or the like.

The audio processor 161 is a constituent element that processes audio data. The audio processor 161 may perform various processes, such as audio data decoding, amplification, and noise filtering.

The video processor 163 is a constituent element that processes video data. The video processor 163 may perform various image processes, such as video data decoding, scaling, noise filtering, frame rate conversion, and resolution conversion. More particularly, the above-described codec may be implemented by software or hardware. The video processor 163 may include a codec implemented by hardware, and may perform encoding or decoding of the video data using the codec.

The speaker 170 may output not only various kinds of audio data processed by the audio processor 150 but also various kinds of notification sound or voice messages.

The sensor 180 is a constituent element for detecting user's operations for the device 100 or states of the device 100. The sensor 180 may include a geomagnetic sensor 181, a gyro sensor 182, an acceleration sensor 183, and a touch sensor 184.

The geomagnetic sensor 181 is a sensor for detecting the change of geomagnetism of the surroundings using a two-axis or three-axis flux gate. The controller 130 may calculate an azimuth angle using the geomagnetic value detected by the geomagnetic sensor 181. Accordingly, the rotation direction of the server device 100 can be determined.

The acceleration sensor 182 is a sensor for detecting acceleration and the direction of the acceleration when motion occurs. Specifically, the acceleration sensor 182 outputs a detecting value that corresponds to the gravitational acceleration that is changed according to the inclination of the device 100 on which the sensor is attached. The controller 130 may determine the degree of inclination of a moving body using the output value of the acceleration sensor 182.

The gyro sensor 183 is a sensor that detects an angular velocity by measuring Coriolis force that acts in the speed direction if a rotating motion occurs. The controller 130 may detect the rotation of the device 100 using the measurement value of the gyro sensor 183.

The touch sensor 184 may be connected to the display 120 and detect a user's touch operation. The touch sensor 184 may be implemented as a capacitive type or a resistive type. The capacitive type touch sensor means a sensor which calculates touch coordinates by detecting fine electricity that is induced in a body of a user using a dielectric material that is coated on the surface of the display 120 when a part of the body of the user touches the surface of the display 120. The resistive type touch sensor means a touch sensor which includes two electrode plates built in the display 120, and calculates touch coordinates by detecting a current flow when the user touches the surface of the display 110 and the upper and lower plates of the touched point come in contact with each other. The sensor 180 detects and provides to the controller 130 coordinates of the point where the user touches through the touch sensor.

The controller 130 may perform various control operations according to various kinds of detecting signals provided from the sensor 180. For example, if the coordinate value of the point that is touched by the touch sensor 184 corresponds to the coordinates where a content share icon is displayed, the controller 130 may recognize that a content share command is selected, and thus, perform the corresponding operation.

Further, if it is detected that the device 100 is rotated in the horizontal or vertical direction by the geomagnetic sensor 181, the gyro sensor 182, and the acceleration sensor 183, the controller 130 may perform a screen change operation according to the rotating direction. For example, the controller 130 may rotate the screen of the content that is displayed on the display 120 according to the rotation of the device 100.

In addition, the device 100 may further include various constituent elements, such as the button 191, the USB port 192, the camera 193, and the microphone 194. The button 191 may be any type of button, such as a mechanical button, a touch button, or a wheel, which is formed on a certain region, such as a front portion, a side portion, or a rear portion of a main body of the device. The USB port 192 means a port to which a USB memory or a USB connector is connected. The device 100 may confirm whether the content, which is stored in the external device that is connected through not only the USB port 192 but also various kinds of connection ports, can be shared through searching for the content.

If the camera 193 and the microphone 194 are provided, the controller 130 may perform a control operation according to user voice input through the microphone 194 or a user motion that is recognized by the camera 193. In a motion control mode, the controller 130 may activate the camera 193, and capture an image of the user, track the user's motion change, and perform the corresponding control operation. If it is determined that the user performs a motion that corresponds to the content sharing function, the controller 130 may recommend the services and the share targets for sharing the selected content, and display a corresponding list on the display 120. Further, the controller 130 may analyze a user voice input through the microphone 192, and if it is determined that the user pronounces voice that corresponds to the content sharing function, the controller 130 may recommend the services and the share targets for sharing the selected content, and display the corresponding list on the display 120.

The above-described operation of the controller 130 may be performed by a program stored in the memory 150.

For example, Operating System (OS) software for driving the device 100, an application for performing the content sharing function, various kinds of data input or set during execution of the application, and various data, such as content, may be stored in the memory 150. The controller 130 controls the whole operation of the device 100 using various kinds of programs stored in the memory 150.

Specifically, the controller 130 may include a RAM 131, a ROM 132, a main CPU 133, a graphic processor 134, first to n-th interfaces 135-1 to 135-$n$, and a bus 136.

The RAM 131, the ROM 132, the main CPU 133, the graphic processor 134, and the first to n-th interfaces 135-1 to 135-$n$ are connected to each other through the bus 136 to transmit or receive various kinds of data or signals.

The first to n-th interfaces 135-1 to 135-$n$ are connected to not only the various kinds of constituent elements illustrated in FIG. 3 but also other constituent elements to be accessed by the main CPU 133.

The main CPU 133 accesses the memory 150, and performs booting using the O/S stored in the memory 150. Further, the main CPU 133 performs various operations using various kinds of programs, content, and data stored in the memory 150.

Specifically, a command set for system booting is stored in the ROM 132. If a turn-on command is input and the power is supplied, the main CPU 133 copies the O/S stored in the memory 150 into the RAM 131 according to the command stored in the ROM 133, and boots the system by executing the O/S. If the booting is completed, the main CPU 133 copies various kinds of application programs stored in the memory 150 into the RAM 131, and performs various kinds of operations by executing the application programs copied into the RAM 131.

The graphic processor 134 forms various kinds of screens under the control of the main CPU 133. Specifically, the graphic processor 134 may display screens as shown in FIGS. 6 to 20. The graphic processor 134 calculates display status values of the screens. The display status values may be attribute values that indicate coordinate values of a position where an object is to be displayed on the screen, and the shape, size, and colors of the object. If the display status values are calculated, the graphic processor 134 generates a screen by performing a rendering based on the display status values.

If it is determined that the user inputs the content sharing command by the sensor 180 or the button 191, the main CPU 133 searches for the content stored in the memory 150, and controls the graphic processor 124 to generate the screen corresponding to the result of the search.

As described above, the controller 130 may perform various kinds of operations by copying into the RAM 131 and executing the program stored in the memory 150.

Figure 4:
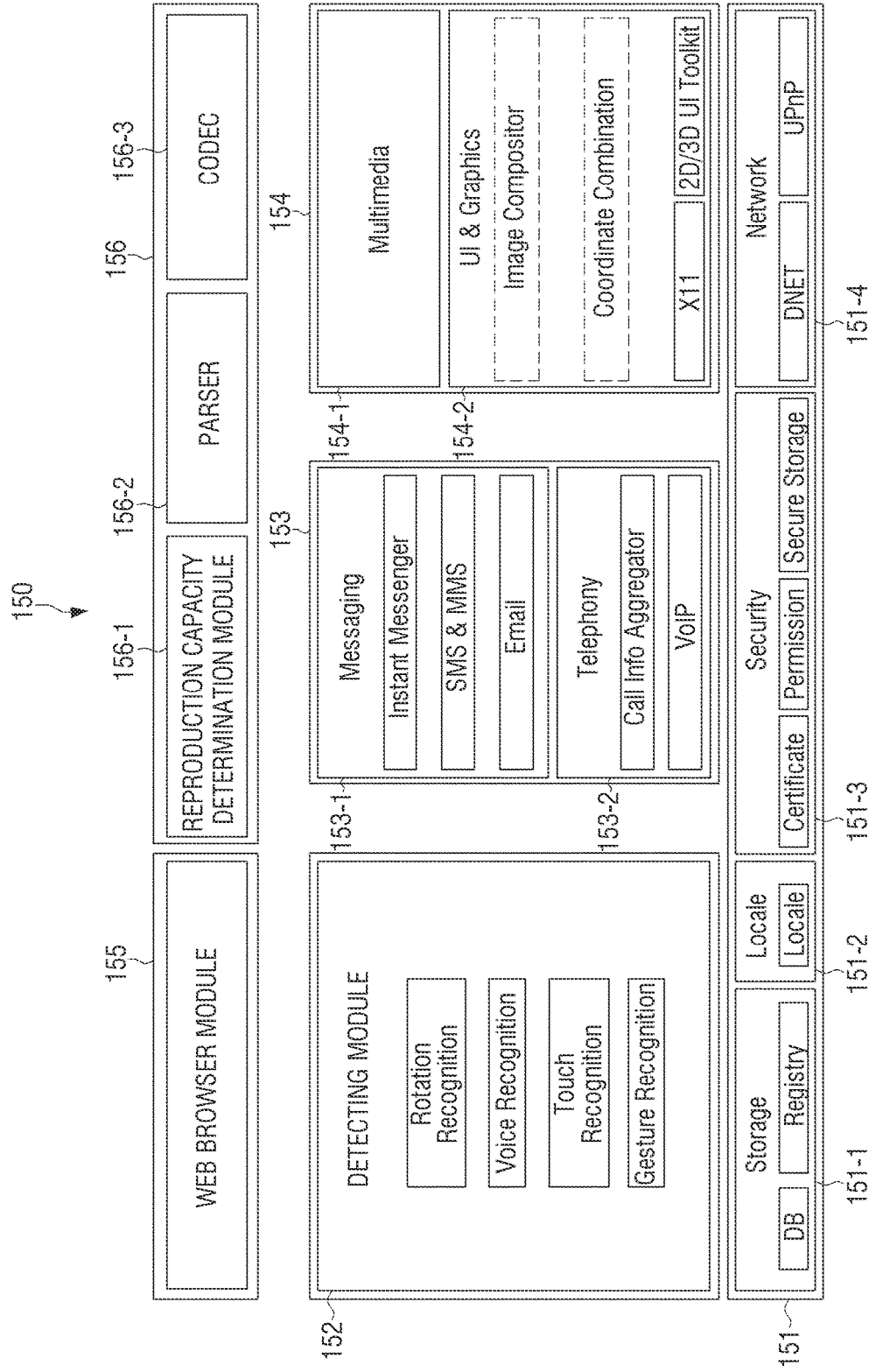
FIG. 4 is a diagram illustrating software layers stored in a memory according to an embodiment of the present disclosure.

FIG. 4 is a diagram illustrating software layers stored in a memory according to an embodiment of the present disclosure.

Referring to FIG. 4, the memory 150 includes a base module 151, a detecting module 152, a communication module 153, a presentation module 154, a web browser module 155, and a content processing module 156.

The base module 151 means a basic module which processes signals transferred from hardware included in the device 100 and transfers the processed signals to an upper-layer module.

The base module 151 includes a storage module 151-1, a position-based module 151-2, a secure module 151-3, and a network module 151-4.

The storage module 151-1 is a program module that manages a DataBase (DB) or registries. The main CPU 133 may read various kinds of data by accessing the database in the memory 150 using the storage module 151. The position-based module 151-2 is a program module that interlocks with various kinds of hardware, such as a GPS chip, to support a position-based service. The secure module 151-3 is a program module that supports hardware certification, request permission, and secure storage, and the network module 151-4 includes a modulo Distributed NETwork (DNET) module and a Universal Plug and Play (UPnP) module for supporting a network connection.

The detecting module 152 is a module which manages and uses information on external inputs and external devices. The detecting module 152 includes a rotation recognition module, a voice recognition module, a touch recognition module, and a gesture recognition module. The rotation recognition module is a program that calculates a rotating angle and a rotating direction using detecting values detected by the sensors, such as the geomagnetic sensor 181 and the gyro sensor 182. The voice recognition module is a program that extracts a user voice by analyzing the voice signal collected through the microphone 194. The touch recognition module is a program that detects touch coordinates using the detecting values detected by the touch sensor 184. The gesture recognition module is a program that recognizes user gestures by analyzing images captured by the camera 193.

The communication module 153 is a module for performing communication with the outside. The communication module 153 may include a messaging module 153-1 including a messenger program, a Short Message Service (SMS) & a Multimedia Message Service (MMS) program, and an email program, and a phone module 153-2 including a call information aggregator program module, and a VoIP module.

The presentation module 154 is a module for configuring a display screen. The presentation module 154 includes a multimedia module 154-1 for reproducing and outputting multimedia content, and a UI & graphic module 154-2 for performing UI and graphic processing. The multimedia module 154-1 may include a player module, a camcorder module, and a sound processing module. Accordingly, the multimedia module 154-1 reproduces various kinds of multimedia content to generate and reproduce a screen and sound. The UI & graphic module 154-2 may include an image compositor module for combining images, a coordinate combination module for combining and generating coordinates on the screen on which an image is to be displayed, an X11 module for receiving various kinds of events from hardware, and a 2 Dimensional/3 Dimensional (2D/3D) UI tool kit for providing a tool for configuring 2D or 3D type UI.

The web browser module 155 means a module that accesses a web server by performing web browsing. The web browser module 155 may include various modules, such as a web view module for configuring a web page, a download agent module for performing a download, a bookmark module, and a web kit module.

The content processing module 156 means software for processing the content stored in the memory 150. A reproduction capacity determination module 156-1 is a program that operates as an algorithm for comparing reproduction capacity information and content attributes with each other. A parser 156-2 and a codec 156-3 are software provided to the video processor 160 to process the content. The parser 156-2 is normally implemented by software, and the codec 156-3 may be implemented by software or hardware.

In addition, various application modules, such as a navigation service module and a game module, may be further included.

The various kinds of program modules illustrated in FIG. 4 may be partially omitted, modified, or added depending on the kinds and characteristics of the device 100. For example, if the device 100 is a smart phone, an e-book application, a game application, and other utility programs may be further included. Further, parts of the program modules of FIG. 4 may be omitted.

Further, the constituent elements illustrated in FIG. 3 may be partially omitted, modified, or added depending on the kinds and characteristics of the device 100. For example, if the device 100 is a TV, hardware, such as an antenna or a tuner, may be further included.

Figure 5A:
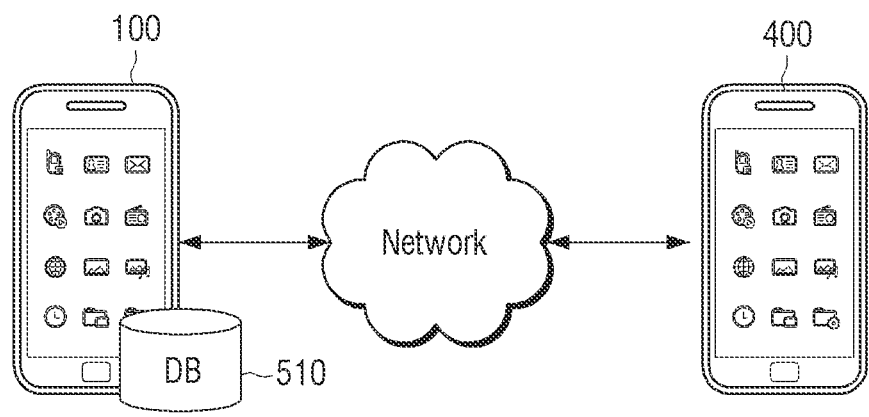
FIGS. 5A and 5B are diagrams illustrating a content sharing system according to an embodiment of the present disclosure.
Figure 5B:
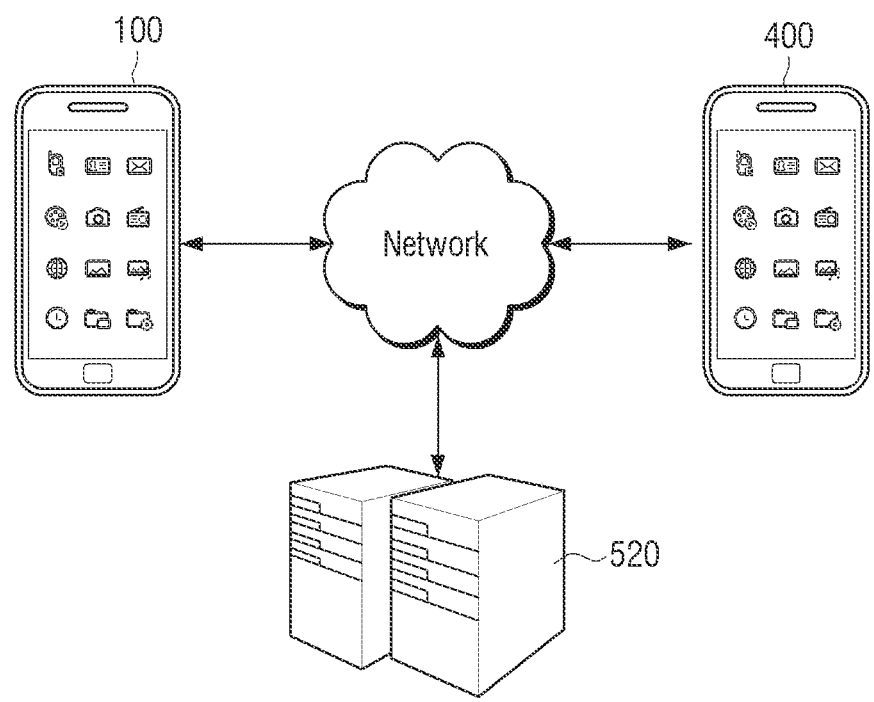

FIGS. 5A and 5B are diagrams illustrating a content sharing system according to an embodiment of the present disclosure. More particularly, FIGS. 5A and 5B are diagrams illustrating a database for storing context information, and for convenience in explanation, the first and second servers 200 and 300 are not illustrated.

Referring to FIG. 5A, the context information may be stored in the device 100. Specifically, the context information may be stored in the memory 150 provided in the device 100 as a database, and in this case, the memory 150 may be implemented in the form of a micro server 510.

Referring to FIG. 5B, the context information may be stored in an external server 520 that is separately provided. Specifically, the controller 130 may monitor the interactions generated by services that can be provided in the devices 100, and transfer the context information according to the interaction to the external server 520.

In this case, the external server 520 may store the context information by devices 100. For example, the device information may be received from the device 100, and the context information may be stored to match the device information.

On the other hand, if at least one user operation of a share command for the content, a share command for an external device, and a share command for a user is input, the controller 130 may request the external server 520 to transfer the content information, and control the communicator 140 to receive the context information from the external server 520. For example, the controller 130 may transfer the device information of the device to the external server, and receive the context information matching the device information.

Figure 6A:
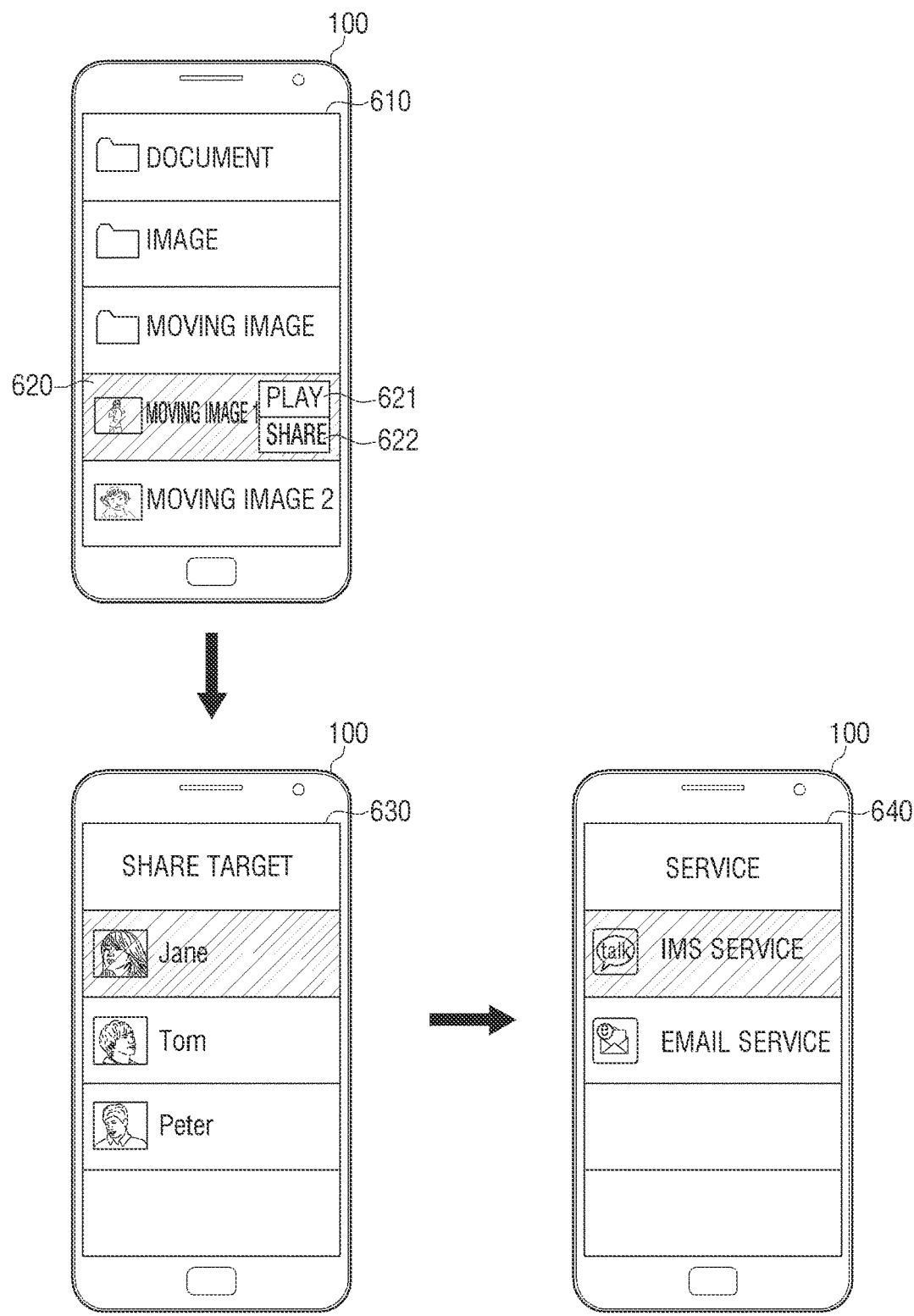
Figure 6B:
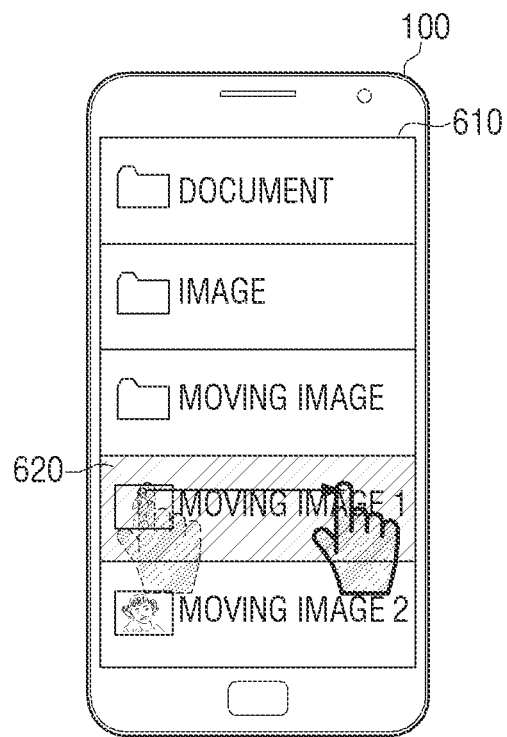

FIGS. 6A, 6B, and 6C are diagrams illustrating a method for sharing content according to an embodiment of the present disclosure.

Referring to FIG. 6A, a list 610 of moving images stored in the device 100 is displayed, and if one moving image 620 is selected according to a user's touch operation, a Graphical User Interface (GUI) element 621 for receiving an input of a reproduction command of the corresponding content and a GUI element 622 for receiving an input of a share command may be displayed. However, this is merely an example and the GUI element 622 for receiving an input of the share command may be displayed without the GUI element 621.

Thereafter, if the GUI element 622 is selected, a list 630 of the recommended share targets is displayed. For example, if other devices, which have performed the interaction more than a certain number of times, are recommended as share targets, user names of the other devices may be displayed on the list 630 together with images of the corresponding users. However, this is merely an example and the user names may be displayed without the images of the corresponding users.

Thereafter, if the share target is selected on the list 630, a list 640 of the recommended services is displayed. For example, if services that have recently performed the interaction are recommended as the share services, titles of the services and icons may be displayed on the list 640. However, this is merely an example and just the titles or icons may be displayed.

Accordingly, if a service is selected on the list 640 of the services, the device 100 transfers the selected content to the selected share target using the selected service. For example, if "Jane" is selected as the share target and an IMS service is selected as the service, the device 100 may transfer a moving image 1 to a device of "Jane" using the IMS service.

On the other hand, in the above-described embodiment, it is described that the list of the share targets is displayed prior to the list of the services. However, this is merely an example and the list of the services may be displayed prior to the list of the share targets.

Further, in the above-described embodiment, it is described that the content is stored in the device 100, but this is only for convenience in explanation. For example, even if the content is stored in the first server 200, the device 100 may display the list of the content stored in the first server 200 by logging in to the first server 200 through the user account, and recommend the service and the share target related to the content selected on the list. This may be applied in the same manner to cases illustrated in FIGS. 7 to 20.

Further, in the above-described embodiment, it is described that GUI elements for receiving an input of a share command are separately displayed. However, this is merely an example and the device 100 may determine that the share command for the selected content is input if a certain touch gesture is input.

Referring to FIG. 6B, if a flick gesture is input from left to right in a state where a moving image 620 is selected, the device 100 may display the list 630 of the share targets to share the selected content and the list 640 of the services. However, this is merely an example and various touch gestures, such as a double tap, may be input.

Further, in the above-described embodiment, it is described that if one piece of content is selected on the list of the content stored in the device 100, the share targets and the services are recommended. However, this is an example and the share command for the corresponding content may be input during reproduction of the content.

Referring to FIG. 6C, if a user touches the screen in a state where a moving image 650 is reproduced, a GUI element 651 for receiving an input of the share command may be displayed at a lower end of the screen. Accordingly, if the GUI element 651 is selected, the list 630 of the recommended share targets and the list 640 of the share services may be displayed.

Figure 7:
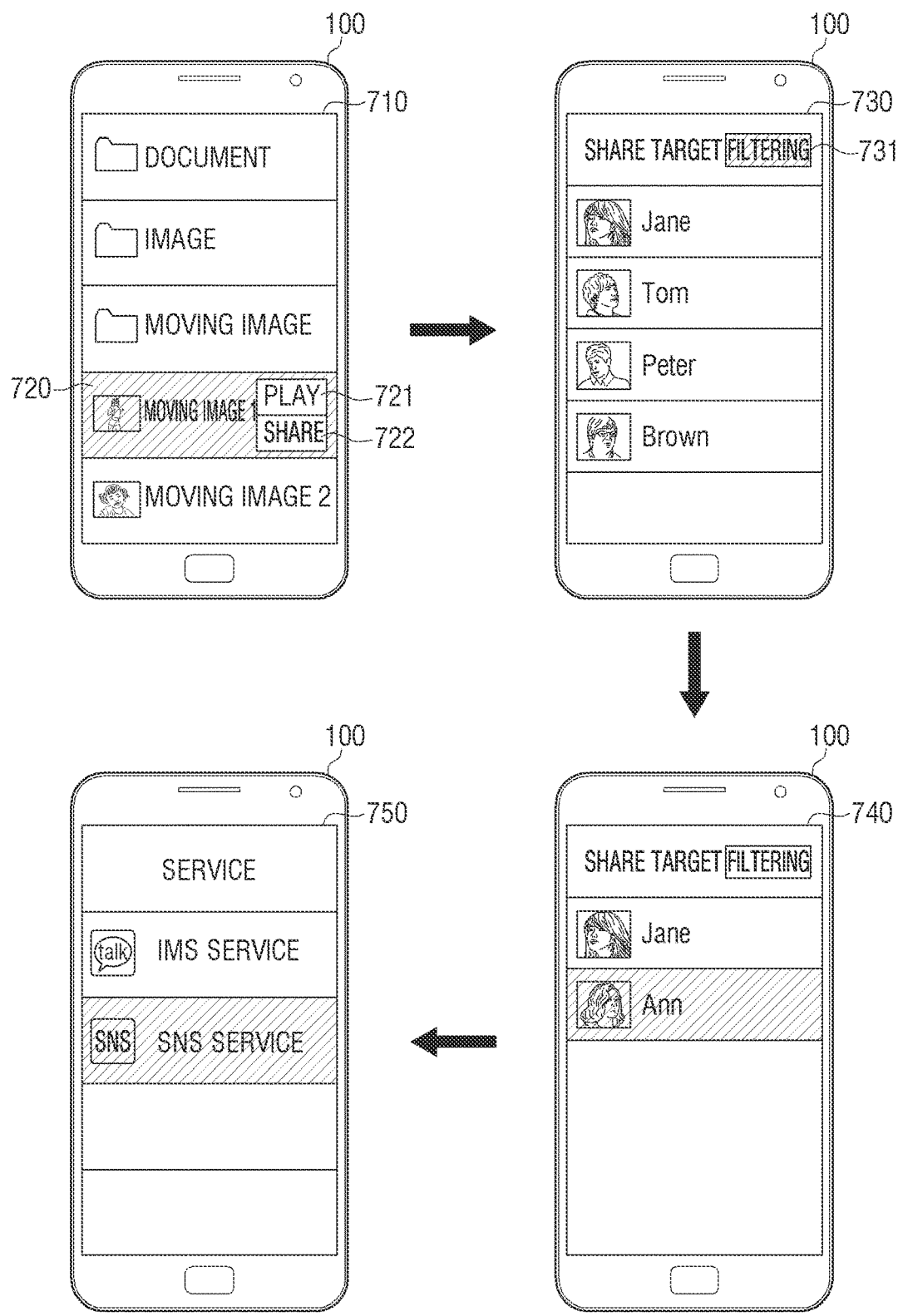

FIG. 7 is a diagram illustrating a method for sharing content according to an embodiment of the present disclosure.

Referring to FIG. 7, a list 710 of moving images stored in the device 100 is displayed, and if one moving image 720 is selected according to a user's touch operation, a GUI element 721 for receiving an input of a reproduction command of the corresponding content and a GUI element 722 for receiving an input of a share command may be displayed.

Thereafter, if the GUI element 722 is selected, a list 730 of the recommended share targets is displayed. For example, if other devices, which have performed the interaction with the device 100 more than a certain number of times, are recommended as share targets, user names of the other devices may be displayed on the list 730 together with images of the users.

On the other hand, a GUI element 731 for filtering the recommended share targets based on another piece of context information may be displayed on the list 730 of the share targets. However, this is merely an example and the GUI element 731 may also be displayed on another region of the screen provided on the device 100 rather than on the share target list 730.

Accordingly, if the GUI element 731 is selected, the device 100 may re-recommend the share targets through filtering the primarily recommended share targets based on the other context information. For example, a share target list 740 that includes other devices, which have recently performed the interaction, among other devices, which have performed the interaction more than the certain number of times, may be displayed.

For example, as illustrated in FIG. 7, user names "Jane" and "Ann" of the other devices, which have recently performed the interaction, among user names "Jane", "Tom", "Peter", "Brown", . . . of the other devices, which have performed the interaction with the device 100 more than the certain number of times, are displayed.

On the other hand, in the above-described embodiment, it is described that time information of the interactions is used to re-recommend the share targets. However, this is merely an example and various kinds of information included in the context information may be used.

Thereafter, if one share target is selected on the list 740 of the share targets, a list 750 of the recommended services is displayed, and if one service is selected on the list 750 of the services, the device 100 transfers the selected content to the selected share target using the selected service.

For example, if "Ann" is selected as the share target and the SNS service is selected as the share service, the device 100 may transfer a moving image 1 to the account of "Ann" of the SNS server.

On the other hand, in the above-described embodiment, it is described that the share targets are re-recommended based on a separate user operation, but this is merely one example. Specifically, the device 100 may display the list of the recommended share targets using the plural pieces of context information without any separate user operation. For example, as illustrated in FIG. 7, if the share command is input, the device 100 may directly display the list 740 without displaying the list 730.

Further, in the above-described embodiment, it is described that the GUI elements for receiving an input of a command for re-recommending the share targets are displayed, but this is merely one example. For example, the share targets or the services may be re-recommended according to a certain touch gesture without displaying a separate GUI element. Here, the touch gesture may include a flick and a double tap.

Figure 8:
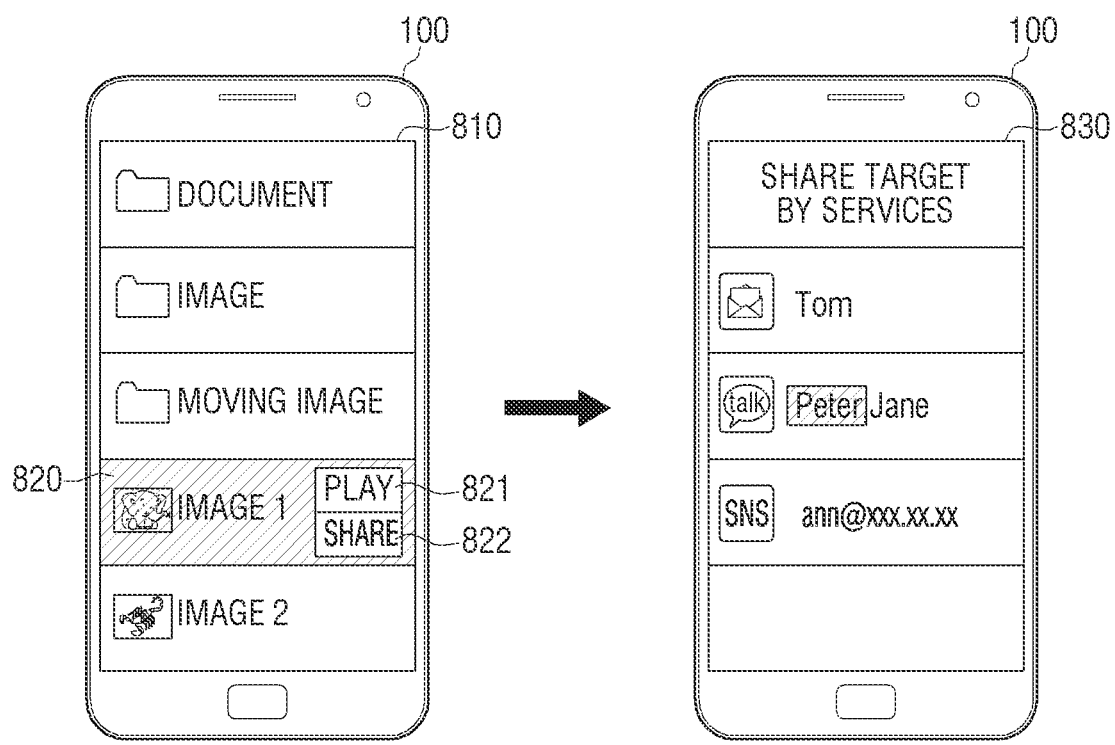

FIG. 8 is a diagram illustrating a method for sharing content according to an embodiment of the present disclosure.

Referring to FIG. 8, a list 810 of images stored in the device 100 is displayed, and if one image content 820 is selected according to a user's touch operation, a GUI element 821 for receiving an input of a reproduction command of the corresponding content and a GUI element 822 for receiving an input of a share command may be displayed.

Here, the reproduction command is a command for display the image content in full view.

Thereafter, if the GUI element 822 is selected, a list 830 of the recommended share targets for the recommended services is displayed.

For example, it is assumed that the device 100 recommends the services, which have performed the interaction more than a certain number of times, among the services, which have been used to perform the interaction with the external devices, and recommends the external devices, which have recently performed the interaction for the corresponding services, as the share targets. In this case, the device 100 may display icons of the respective recommended services and the list 830 including user names of the external devices, which have recently performed the interaction in the corresponding services. On the other hand, if the external devices are servers, the device 100 may display account information of the servers that have performed the interaction.

Thereafter, if one share target is selected on the list 830, the device 100 transfers the selected content to the selected share target using the service through which the selected share target has performed the interaction. For example, if "Peter" is selected as the share target, the service through which the selected shared target has performed the interaction is the IMS service, and thus, the device 100 may transfer image 1 to the device of "Peter" through the IMS service.

Figure 9:
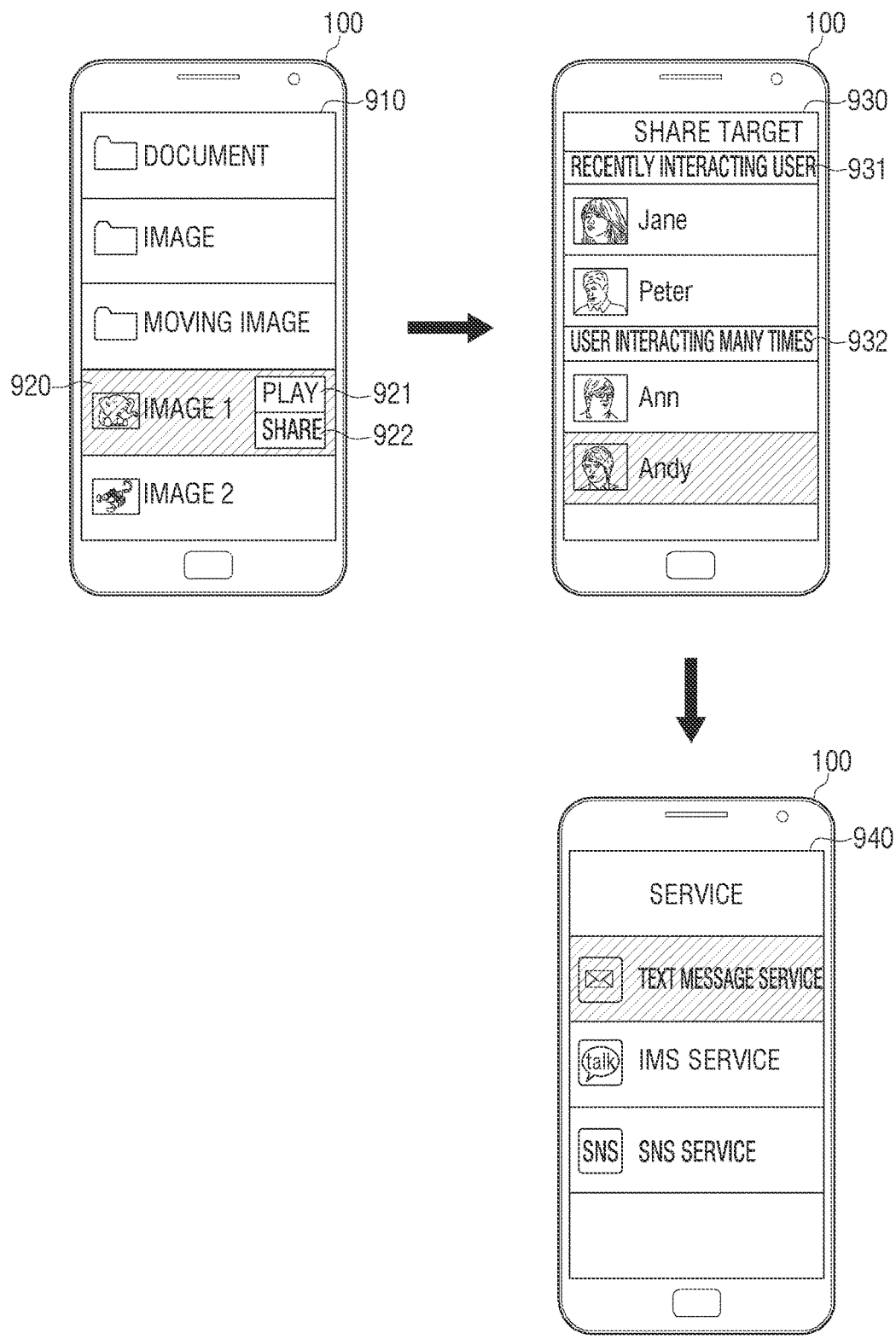

FIG. 9 is a diagram illustrating a method for sharing content according to an embodiment of the present disclosure.

Referring to FIG. 9, a list 910 of images stored in the device 100 is displayed, and if one image 920 is selected according to a user's touch operation, a GUI element 921 for receiving an input of a reproduction command of the corresponding content and a GUI element 922 for receiving an input of a share command may be displayed.

Thereafter, if the GUI element 922 is selected, a list 930 of the recommended share targets is displayed. In this case, the device 100 may display the recommended share targets based on the plural pieces of context information.

For example, other devices, which have recently performed the interaction with the device 100, are recommended as first share targets, and other devices, which have performed the interaction more than a certain number of times, are recommended as second share targets. The first and second share targets may be displayed on the list 930 of the recommended share targets together with names 931 and 932 of the respective share targets.

Thereafter, if one share target is selected on the list 930 of the share targets, a list 940 of the recommended services is displayed, and if one service is selected on the list 940 of the services, the device 100 transfers the selected content to the selected share target using the selected service. For example, if "Andy" is selected as the share target and a text message service is selected as the share service, the device 100 may transfer an image 1 to the device of "Andy" using the text message service.

Figure 10:
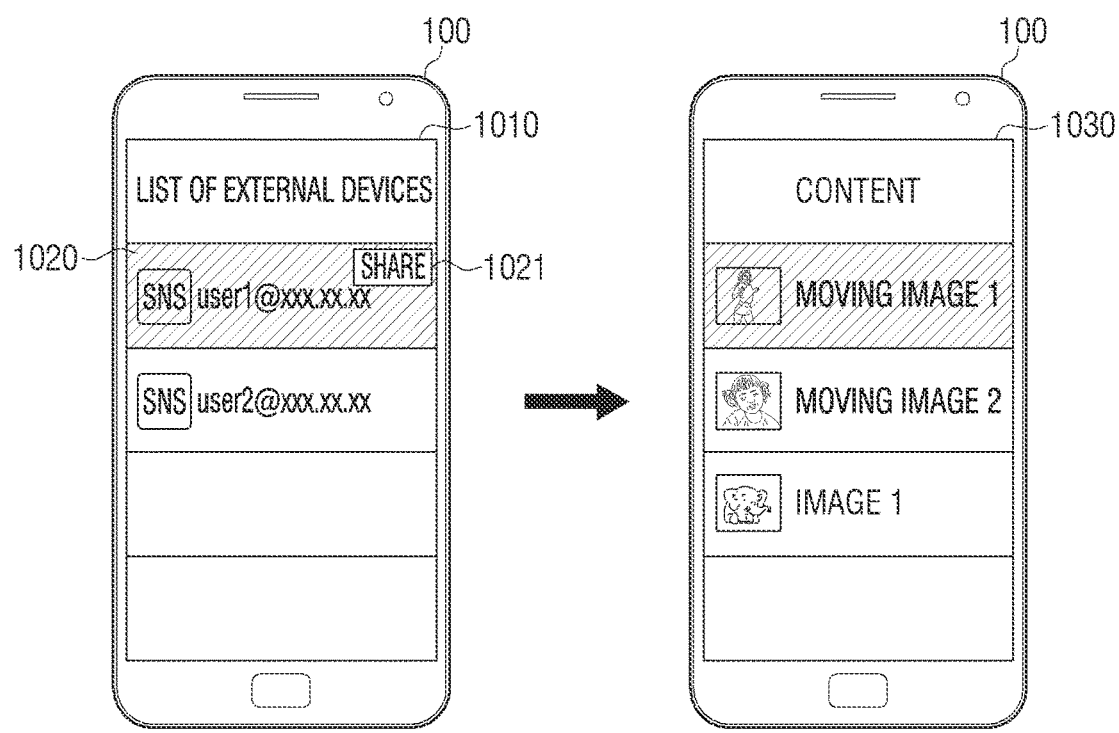

FIG. 10 is a diagram illustrating a method for sharing content according to an embodiment of the present disclosure.

Referring to FIG. 10, if one external device 1020 is selected according to a user's touch operation in a state where a list 1010 of external devices is displayed, a GUI element 1021 for receiving an input of a share command of the selected external device may be displayed. Here, the external device may be an SNS server or a cloud server, and on the list 1010 of the external devices, icons and user's account information of the respective servers may be displayed together.

If the GUI element 1021 is selected, a list 1030 of the recommended content is displayed. For example, if the device 100 recommends the recently downloaded content as the content to be shared, titles of the recently downloaded content may be displayed on the list 1030 together with thumbnail images. However, this is merely an example and just the titles of the content or just the thumbnail images may be displayed.

Thereafter, if one piece of content is selected on the list 1030 of the share content, the device 100 transfers the selected content to the external device. For example, if a moving image 1 is selected as the share content, the device 100 may upload the moving image 1 through user 1 account of the SNS server. In this case, a URL address related to the moving image 1 may be uploaded.

In the above-described embodiment, it is described that the recently downloaded content is recommended as the share content, but this is merely one example. For example, the device 100 may display the list of the recommended content based on various pieces of information included in the context information.

Figure 11:
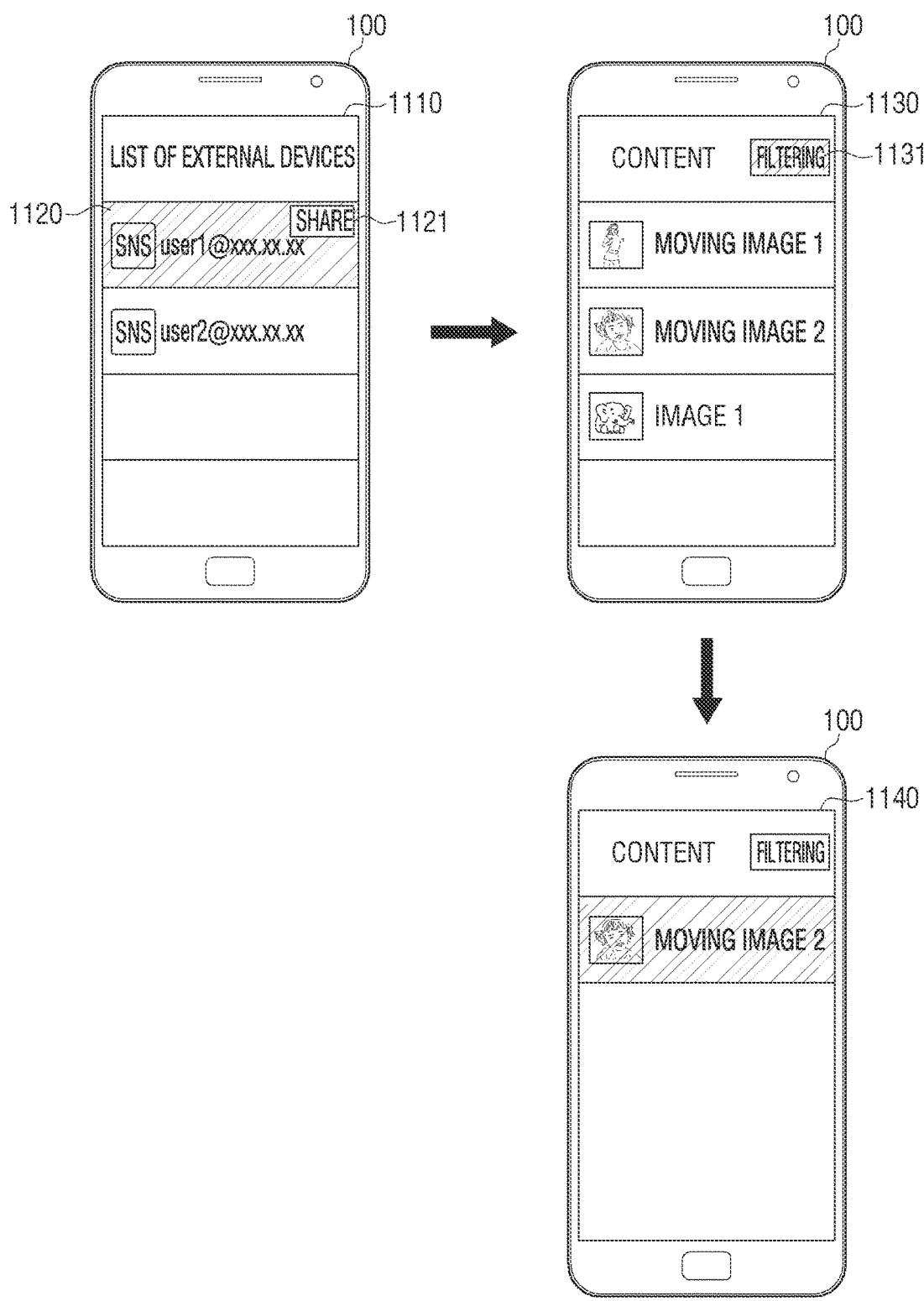

FIG. 11 is a diagram illustrating a method for sharing content according to an embodiment of the present disclosure.

Referring to FIG. 11, if one external device 1120 is selected according to a user's touch operation in a state where a list 1110 of external devices is displayed, a GUI element 1121 for receiving an input of a share command of the selected external device may be displayed.

Thereafter, if the GUI element 1121 is selected, a list 1130 of the recommended content is displayed. For example, if the device 100 recommends the recently downloaded content as the content to be shared, titles of the recently downloaded content may be displayed on the list 1130 together with thumbnail images.

On the other hand, a GUI element 1131 for filtering the recommended content based on another piece of context information may be displayed on the list 1130 of the share content. However, this is merely an example and any list, even if the list is not the list 1130 of the share content, may be displayed on another region of the screen provided on the device 100.

Accordingly, if the GUI element 1131 is selected, the device 100 may re-recommend the content through filtering the primarily recommended content based on the other context information.

For example, a share content list 1140 that includes the content, of which the number of reproductions is equal to or greater than the certain number of reproductions, among the recently downloaded content may be displayed. In the above-described embodiment, the content is re-recommended based on the number of reproductions of the content. However, this is merely an example and various pieces of information included in the context information may be used.

Thereafter, if one piece of content is selected on the list 1140 of the share content, the device 100 transfers the selected content to the external device. For example, if a moving image 2 is selected as the share content, the device 100 may upload the moving image 2 to a user 1 account of the SNS server.

Figure 12:
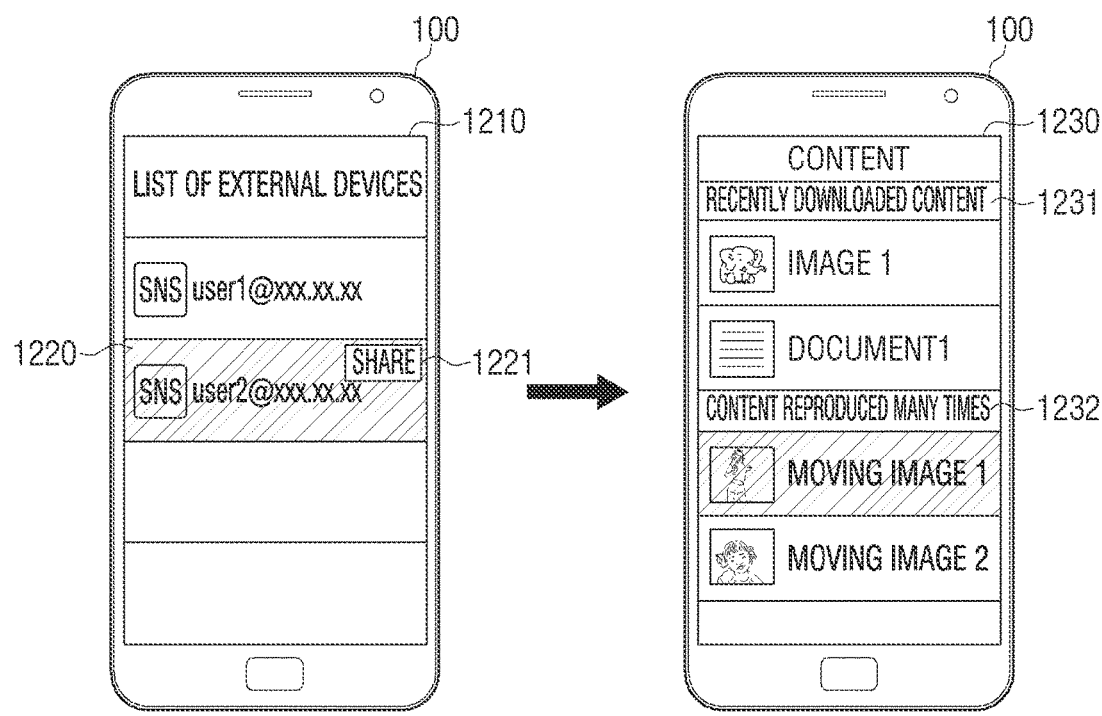

FIG. 12 is a diagram illustrating a method for sharing content according to an embodiment of the present disclosure.

Referring to FIG. 12, if one external device 1220 is selected according to a user's touch operation in a state where a list 1210 of external devices is displayed, a GUI element 1221 for receiving an input of a share command of the selected external device may be displayed.

If the GUI element 1221 is selected, a list 1230 of the recommended content is displayed. For example, the recently downloaded content is recommended as a first content, the content, of which the number of reproductions is equal to or greater than a certain number of reproductions, is recommended as a second content, and the recommended share targets may be displayed on the list 1230 together with titles 1231 and 1232 of the respective share targets.

Thereafter, if one piece of content is selected on the list 1230 of the content, the device 100 transfers the selected content to the external device. For example, if a moving image 1 is selected as the share content, the device 100 may upload the moving image 1 to a user 2 account of the SNS server.

Figure 13A:
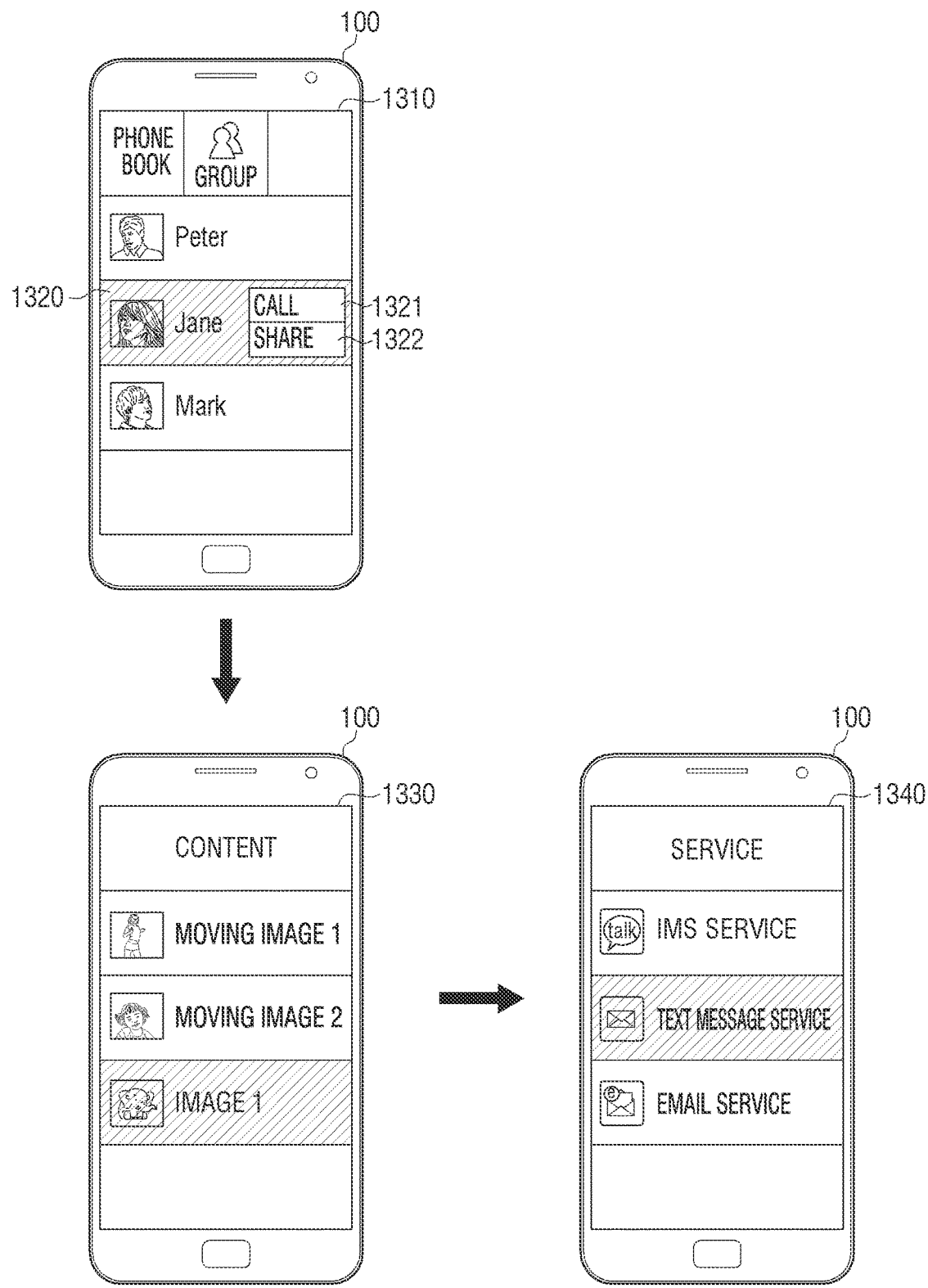
Figure 13B:
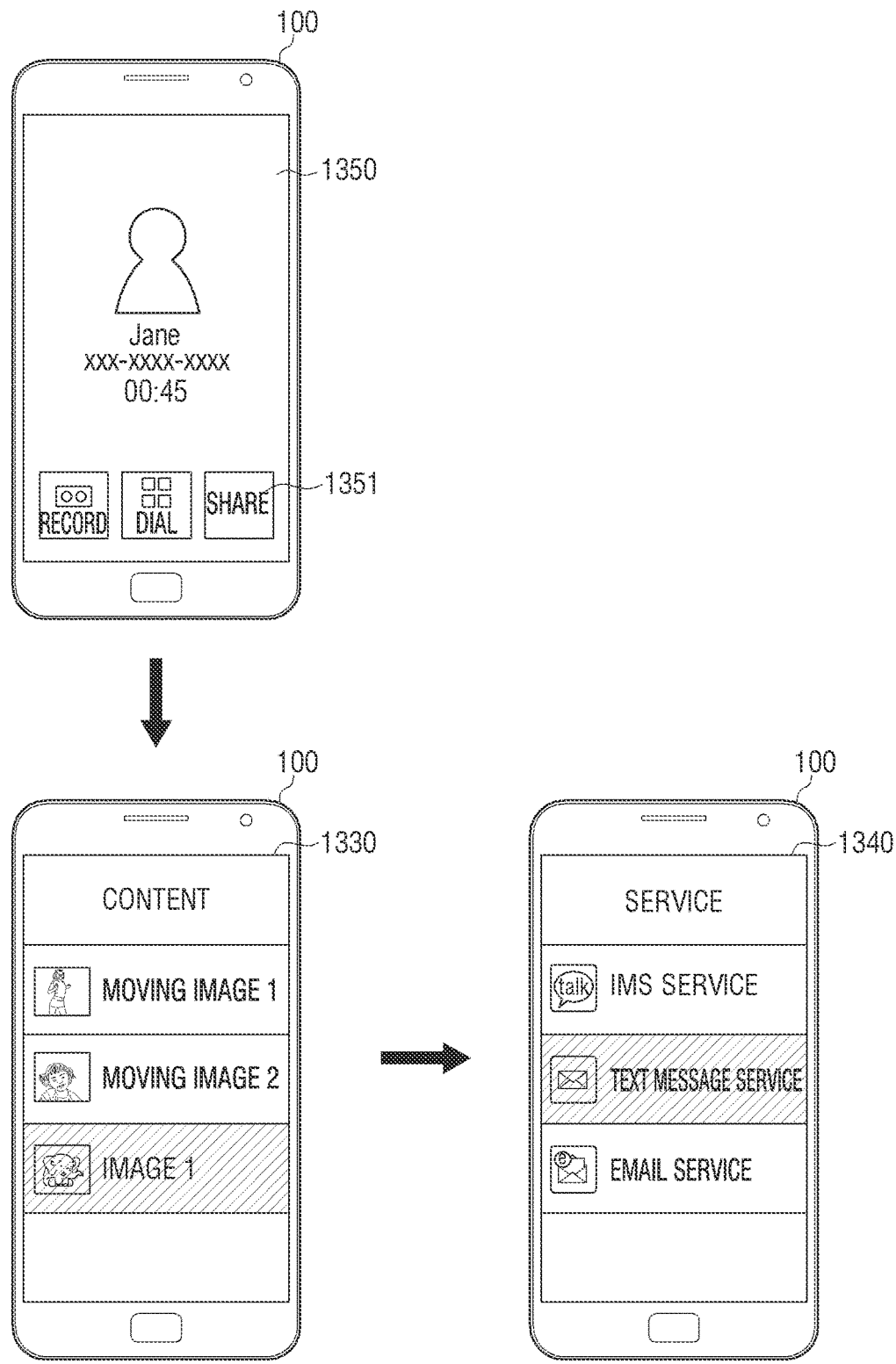

FIGS. 13A and 13B are diagrams illustrating a method for sharing content according to an embodiment of the present disclosure.

Referring to FIG. 13A, if a phone book application 1320 installed in the device 100 is driven, a list 1310 of other users stored in the device 100 is displayed. If another user is selected according to a user's touch operation, a GUI element 1321 for making a phone call to the corresponding user and a GUI element 1322 for receiving an input of a share command may be displayed. However, this is merely an example and the GUI element for receiving an input of the share command may be displayed.

If the GUI element 1322 is selected, a list 1330 of the recommended content is displayed. For example, if the content, which has transferred to the external device more than a certain number of times, is recommended as the content to be shared, titles of the corresponding content may be displayed on the list 1330 together with thumbnail images. However, this is merely an example and just the titles of the content or just the thumbnail images may be displayed.

Thereafter, if one piece of content is selected on the list 1330 of the content, a list 1340 of the services recommended to share the selected content is displayed. For example, if services that have recently performed the interaction are recommended as the share services, titles of the services and icons may be displayed on the list 1340. However, this is merely an example and just the titles or icons may be displayed.

Accordingly, if a service is selected on the list 1340 of the services, the device 100 transfers the selected content to the other user using the selected service. For example, if an image 1 is selected as the content to be shared and a text message service is selected as the service, the device 100 may transfer the image 1 to the device of "Jane" through the text message service using the pre-stored phone number of "Jane".

On the other hand, in the above-described embodiment, it is described that the content that has transferred more than a certain number of times is recommended as the content to be shared and the services that have recently performed the interaction are recommended as the share services. However, this is merely an example and the device 100 may recommend the content and the services to be shared based on various pieces of information included in the context information, and display lists of the recommended share targets and the services.

Further, in the above-described embodiment, it is described that the list of the content is displayed prior to the list of the services. However, this is merely an example and the list of the services may be displayed prior to the list of the content.

Further, in the above-described embodiment, it is described that, if another user is selected on the list of other users that are displayed according to the driving of the of the phone book application, the content to be shared and the service for sharing the content are recommended. However, this is merely an example and a share command of the content may also be input in a calling state.

Referring to FIG. 13B, if the user touches a phone call screen 1350 in a state where the phone call function is performed in the device 100 and the phone call screen 1350 with another user is displayed, a GUI element 1351 for receiving an input of the share command may be displayed at the lower end of the screen. Accordingly, if the GUI element 1351 is selected, the list 1330 of the content to be shared and the list 1340 of the services to share the content may be displayed.

Figure 14:
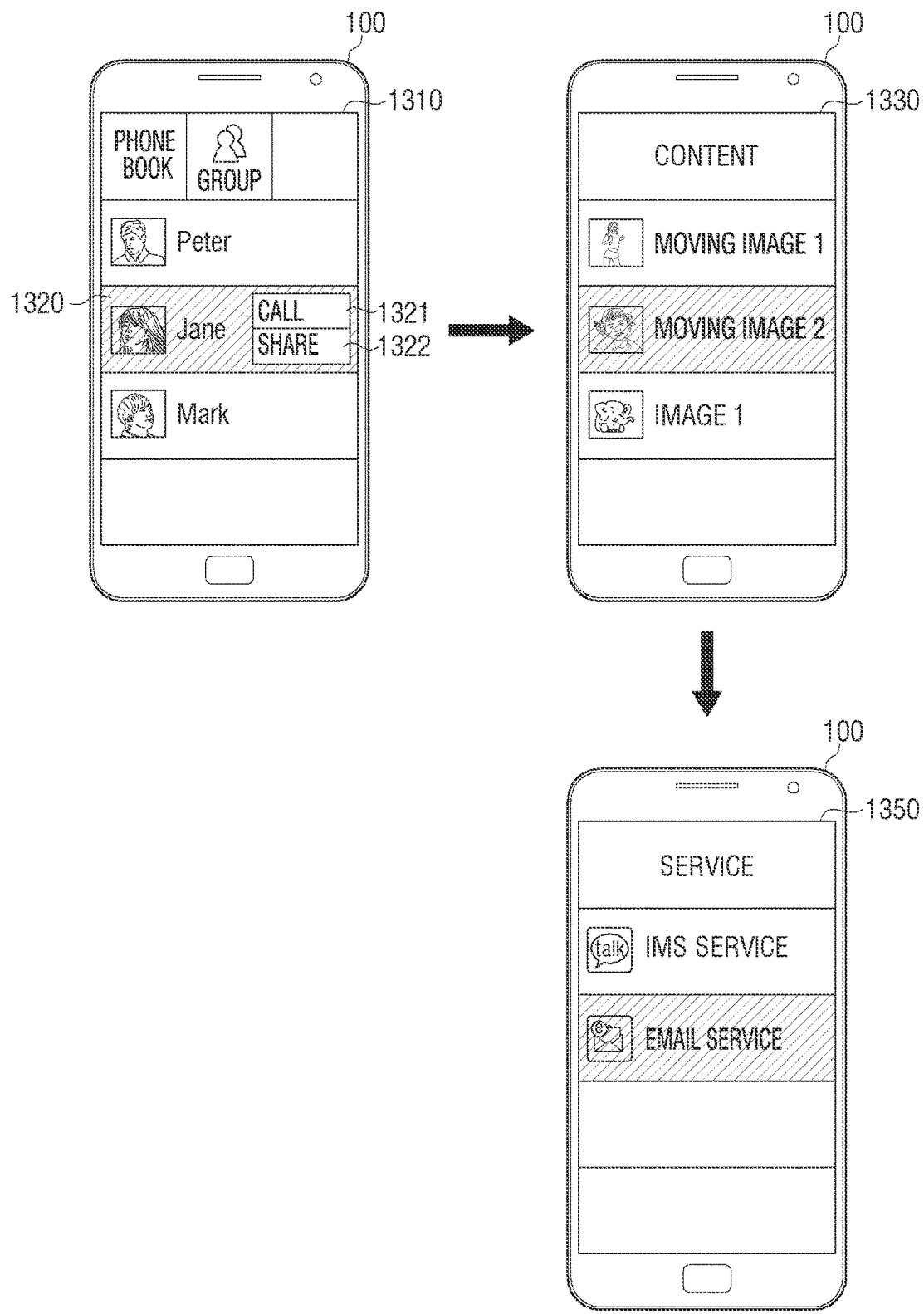

FIG. 14 is a diagram illustrating a method for sharing content according to an embodiment of the present disclosure. More particularly, since FIG. 14 is a diagram illustrating a method for recommending services for sharing the content in consideration of the size of the selected content, explanation of a duplicate portion with respect to FIG. 13 will be omitted.

Referring to FIG. 14, if content is selected on the list 1330 of the content, the device 100 displays a list 1350 of the recommended services to share the selected content.

In this case, in consideration of the size of the selected content, the device 100 displays the service to transfer the selected content among the recommended services on the list 1350 based on the context information. In general, in consideration of the point that the selected moving image is unable to be transferred through the text message service, titles and icons of an email service and an IMS server that can transfer the selected moving image are displayed on the share service list 1350.

Accordingly, if the email service is selected on the list 1350 of the services, the device 100 may transfer the moving image 1 to an email account of "Jane" through the email service using a pre-stored email address of "Jane".

Figure 15:
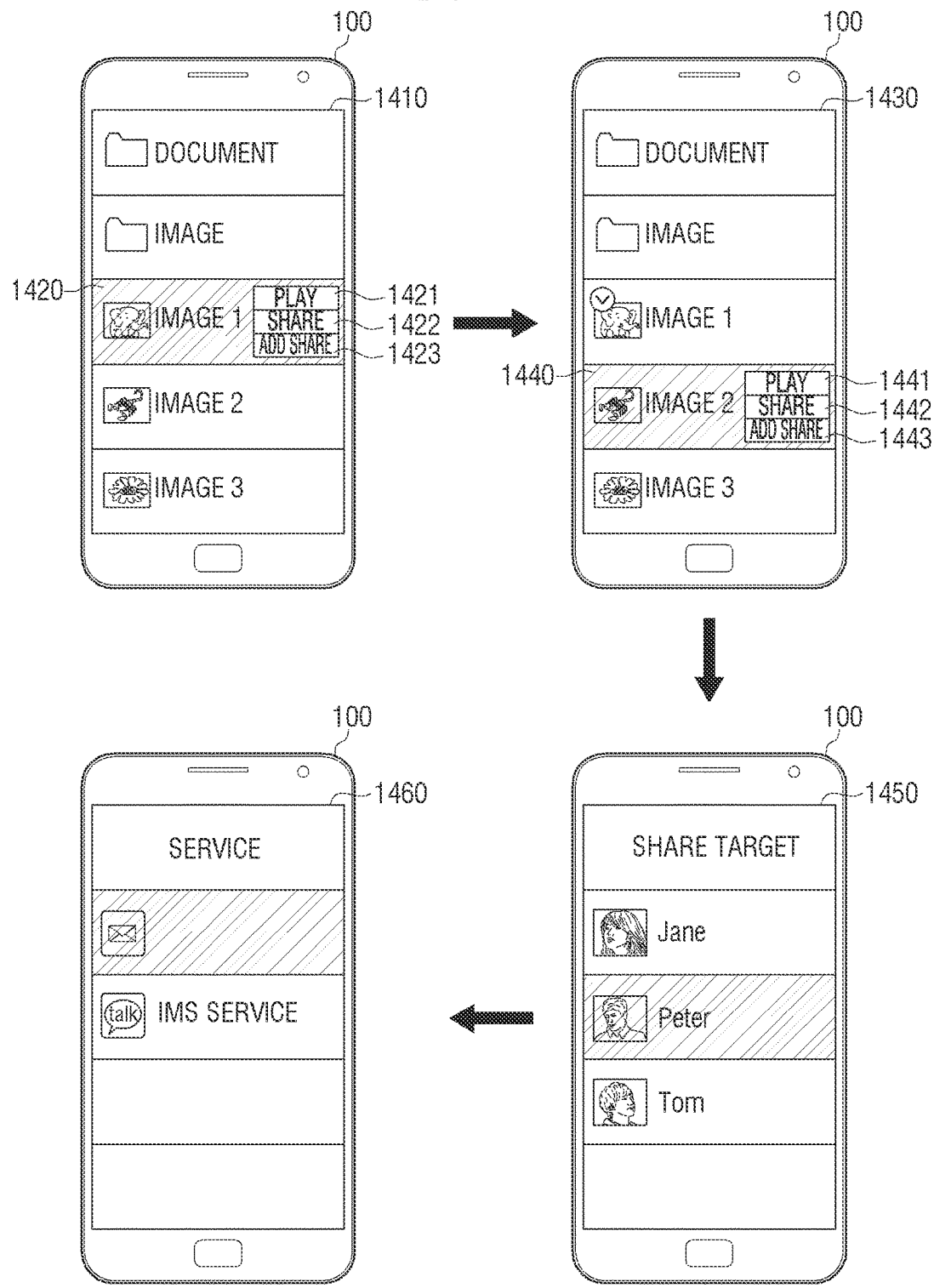
Figure 16:
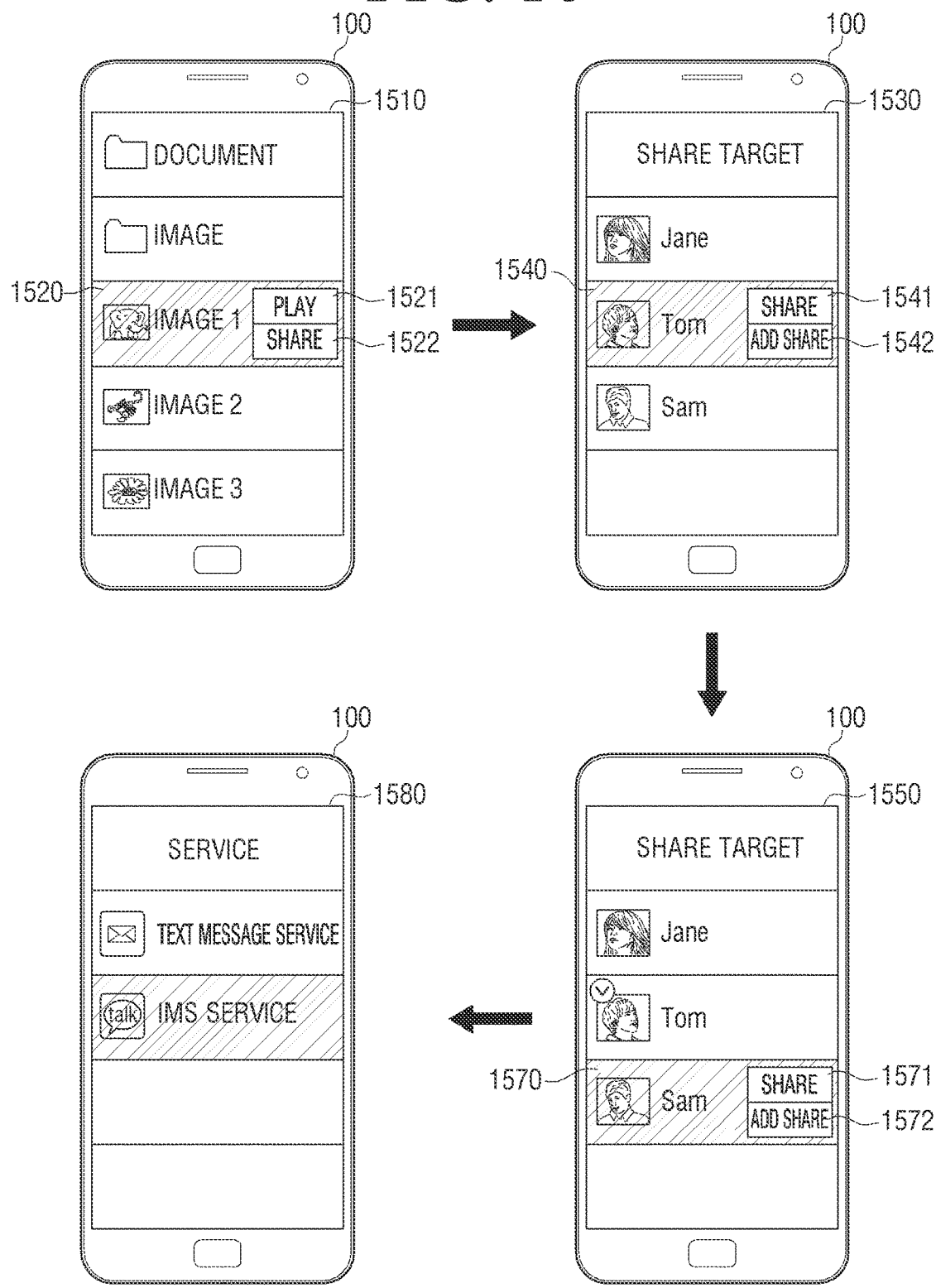

FIGS. 15 and 16 are diagrams illustrating a method for sharing content according to an embodiment of the present disclosure. More particularly, FIG. 15 is a diagram illustrating a method for transferring plural pieces of content to the recommended share targets using the recommended service.

First, referring to FIG. 15, if a list 1410 of an image content stored in the device 100 is displayed and one piece of an image content 1420 is selected according to a user's touch operation, a GUI element 1421 for receiving an input of a reproduction command of the corresponding content and a GUI element 1422 for receiving an input of a share command may be displayed. In this case, a GUI element 1423 for adding the content may be displayed together to transfer plural pieces of content.

Accordingly, if a user selects the GUI element 1423, a check mark (✓) is displayed on the selected image 1420 on a list 1430, and the selected image 1420 may be set as one of the plural pieces of content.

Thereafter, if another image 1440 is selected according to the user's touch operation, a GUI element 1441 for receiving an input of a reproduction command for the corresponding content, a GUI element 1442 for receiving an input of a share command, and a GUI element 1443 for adding the content may be displayed.

Here, if the GUI element 1442 is selected, image 1 and image 2 are determined as content to be shared, and a list 1450 of share targets and a list 1460 of services are sequentially displayed to receive an input of a user selection.

For example, if "Peter" is selected as the share target and a text message service is selected as the service, the device 100 may transfer image 1 and image 2 to the device of "Peter" using the text message service.

On the other hand, FIG. 16 is a diagram illustrating a method for transferring content to a plurality of share targets using recommended services.

Referring to FIG. 16, if a list 1510 of an image content stored in the device 100 is displayed and one piece of an image content 1520 is selected according to a user's touch operation, a GUI element 1521 for receiving an input of a reproduction command of the corresponding content and a GUI element 1522 for receiving an input of a share command may be displayed.

Thereafter, if the GUI element 1522 is selected, a list 1530 of the recommended share targets is displayed. For example, if other devices, which have performed the interaction with the device 100 more than a certain number of times, are recommended as the share targets, user titles of other devices may be displayed on the list 1530 together with the user image.

Thereafter, if a share target is selected on the list 1530 of the share targets, a GUI element 1541 for setting the other selected users and a GUI element 1542 for adding the share targets to set a plurality of share targets may be displayed.

Accordingly, if the user selects the GUI element 1542, a check mark (✓) is displayed on the selected share targets 1540 on the list 1530, and the selected share targets 1540 may be set as one of the plurality of share targets.

Thereafter, if another share target 1570 is selected on a list 1550 according to the user's touch operation, a GUI element 1571 for receiving an input of a share command and GUI element 1572 for adding the content may be displayed.

Here, if the GUI element 1571 is selected, devices of "Tom" and "Sam" are determined as the share targets, and a list 1580 of the services is displayed to receive an input of a user selection.

Figure 17:
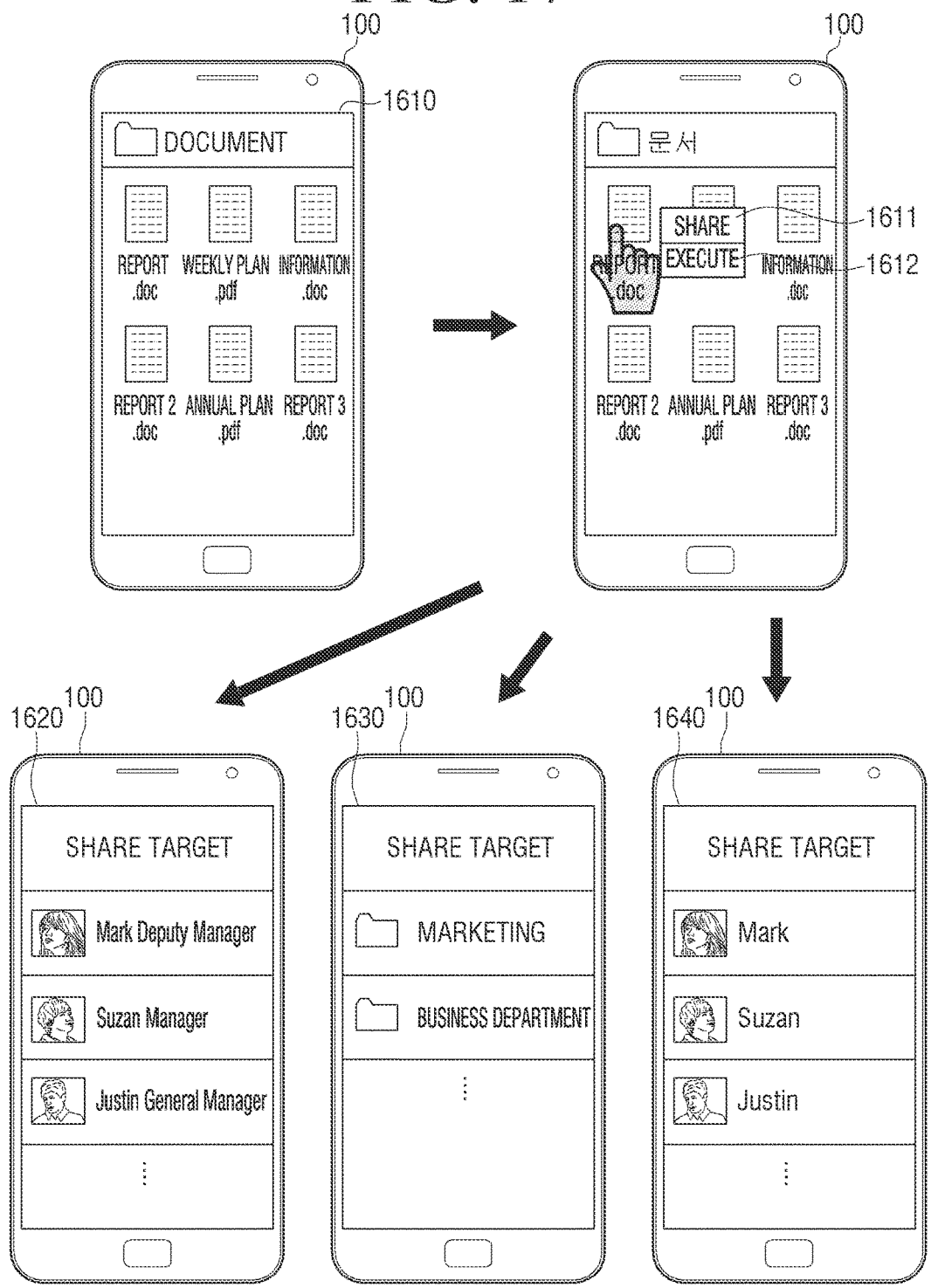

FIG. 17 is a diagram illustrating a method for sharing content according to an embodiment of the present disclosure. More particularly, FIG. 17 is a diagram illustrating a method for sharing content based on situation information at a time when a share command is input.

Referring to FIG. 17, if a list 1610 of text type documents stored in the device 100 is displayed and a user selects one document, a GUI element 1612 for receiving an input of a reproduction command of the corresponding document and a GUI element 1611 for receiving an input of a share command may be displayed. However, this is merely an example and just the GUI element 1611 for receiving an input of the share command may be displayed.

Thereafter, if the GUI element 1611 is selected, the device 100 may recommend the share targets based on the situation information at a time when the share command is input, and display a list of the recommended share targets.

For example, it is assumed that the time when the share command is input is within a user's business hours, and the device is included in a user's business place. In this case, the device 100 may determine that the user intends to share the content in relation to business, recommend other users related to business as share targets, and display a list of the other users.

Specifically, if other users grouped into a category related to business do not exist in a phone book, the device 100 may extract and display other users having names of which the texts related to the job classification exist in the phone book. For example, other users, such as "Mark, deputy manager", "Susan, manager", and "Justin, general manager", may be extracted, and their names and thumbnail images may be displayed on a list 1620.

Further, the device 100 may extract and display other users grouped into a category related to business in the phone book. For example, the group stored in relation to business in the phone book, such as a marketing team or a business team, may be displayed on a list 1630.

Further, the device 100 may access the SNS server through the user account, and receive and display names of persons grouped into a group related to business, phone numbers, and thumbnail images from the SNS server among the related users who are in relation to the user on the SNS. For example, names of persons grouped into a group related to business in the SNS server, such as "Mark", "Suzan", and "Justin", and thumbnail images may be displayed on a list 1640.

Figure 18A:
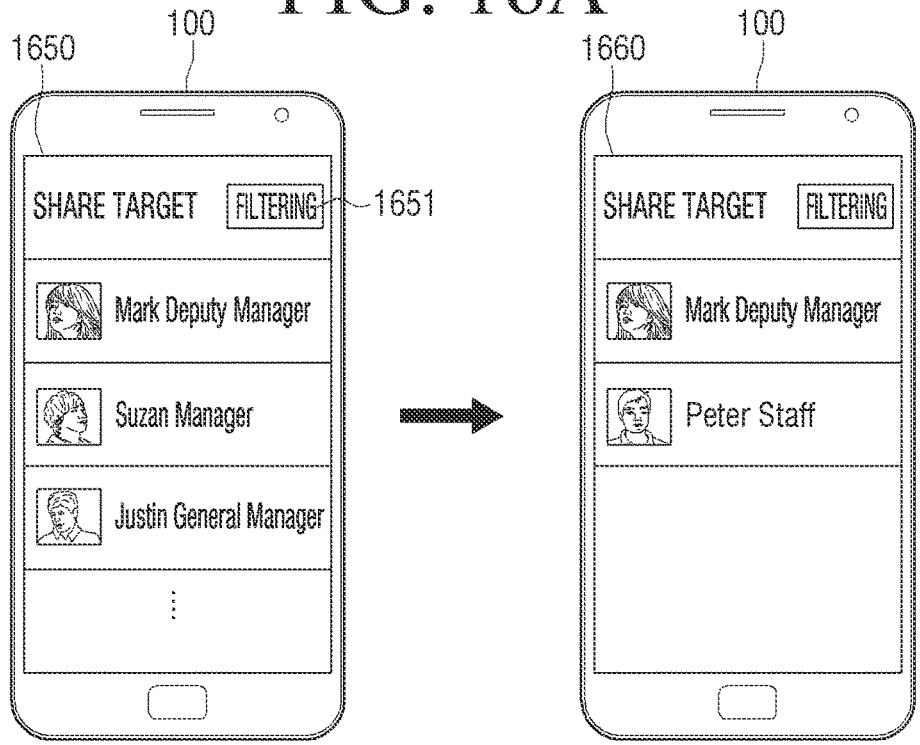
Figure 18B:
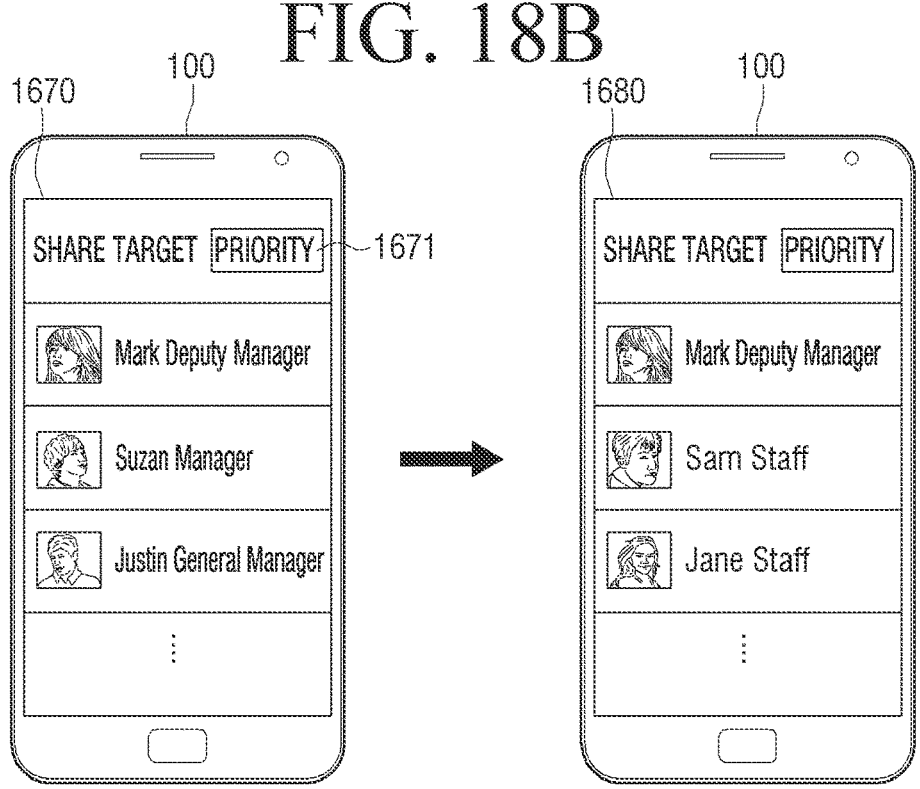

FIGS. 18A and 18B are diagrams illustrating a method for sharing content according to an embodiment of the present disclosure. More particularly, FIGS. 18A and 18B are diagrams illustrating a method for sharing content based on situation information at a time when a share command is input.

Referring to FIG. 18A, it is assumed that the user intends to share content in relation to business, and a list 1650 of other users related to business is displayed. For this, explanation has been made with reference to FIG. 17, and thus, duplicate explanation thereof will be omitted.

In this case, on the list 1650, a GUI element 1651 for filtering the recommended share targets based on the context information may be displayed together. However, this is merely an example and the GUI element 1651 may be displayed on another region of the screen provided on the device 100 instead of the list 1650.

Accordingly, if the GUI element 1651 is selected, the device 100 may re-recommend the share targets through filtering the primarily recommended share targets based on the context information. For example, other users, who have recently performed the interaction more than a certain number of times, may be extracted among the other users related to business, and a list 1660 including "Mark, deputy manager" and "Peter, staff" extracted as above may be displayed.

On the other hand, referring to FIG. 18B, the device 100 may arrange other users recommended in relation to business according to their priority to display the other users. However, this is merely an example and a GUI element 1671 may be displayed on another region of the screen provided on the device 100 instead of a list 1670.

Accordingly, if the GUI element 1671 is selected, the device 100 may give priority to the results of recommendation based on the certain context information and re-arrange and display the results of recommendation in the order of their priority. For example, as shown in FIG. 18B, the recommendation targets may be rearranged in the order of their number of interactions being performed, and a list 1680 may be reconfigured and displayed in the order of "Mark, deputy manager", "Sam, staff", and "Jane, staff".

In the above-described embodiment, it is described that the priority is given based on the number of interactions being performed. However, this is merely an example and various kinds of context information, such as time when the interaction is performed, a position where the interaction is performed, and service information through which the interaction is performed, may be used.

FIGS. 19A and 19B are diagrams illustrating a method for sharing content according to an embodiment of the present disclosure. More particularly, FIGS. 19A and 19B are diagrams illustrating a sharing model that is learned based on the user selection. FIG. 19A is a diagram illustrating a share target recommended before learning, and FIG. 19B is a diagram illustrating a share target recommended after learning.

Specifically, referring to FIG. 19A, if a share command for a text document is input at a user's business place between business hours of 9:00 am to 6:00 pm, other users related to business are recommended as the share targets.

However, if the user selects other users having no relation to the recommended share targets even in a case where other users related to business are recommended as the share targets, the device determines attributes of the selected other users, and stores the determined attributes of the users to match the time when the share command is input.

Thereafter, if the same information is input again, the sharing model may recommend the share targets which are different from the existing share targets based on the pre-stored user attribute information.

For example, referring to FIG. 19B, if the share command for the text document is input again between 12:00 pm to 1:00 pm in the user's business place in a state where the attributes of other users selected between 12:00 pm to 1:00 pm correspond to a family category and a friend category within business hours, other users included in the family category and the friend category having no relation to the business may be recommended as the share targets.

On the other hand, in the above-described embodiments, it is described that a separate GUI element is displayed to receive an input of a user command, such as a share command, filtering of the results of recommendation, and arrangement of the results of recommendation in the order of their priority. However, this is merely an example and various kinds of command may be input using a certain touch gesture without displaying a separate GUI. For example, if a flick operation from left to right is input on the list for recommending the content, the share targets, and the content, the device 100 may determine that the share command is input, while, if a flick operation from right to left is input, the device 100 may determine that a command for filtering the results of recommendation is input. If a double tap operation is input, the device 100 may determine that a command for arranging the results of recommendation according to the priority is input. However, this is merely an example and the touch gesture mapping on the respective commands may be variously changed.

Figure 20:
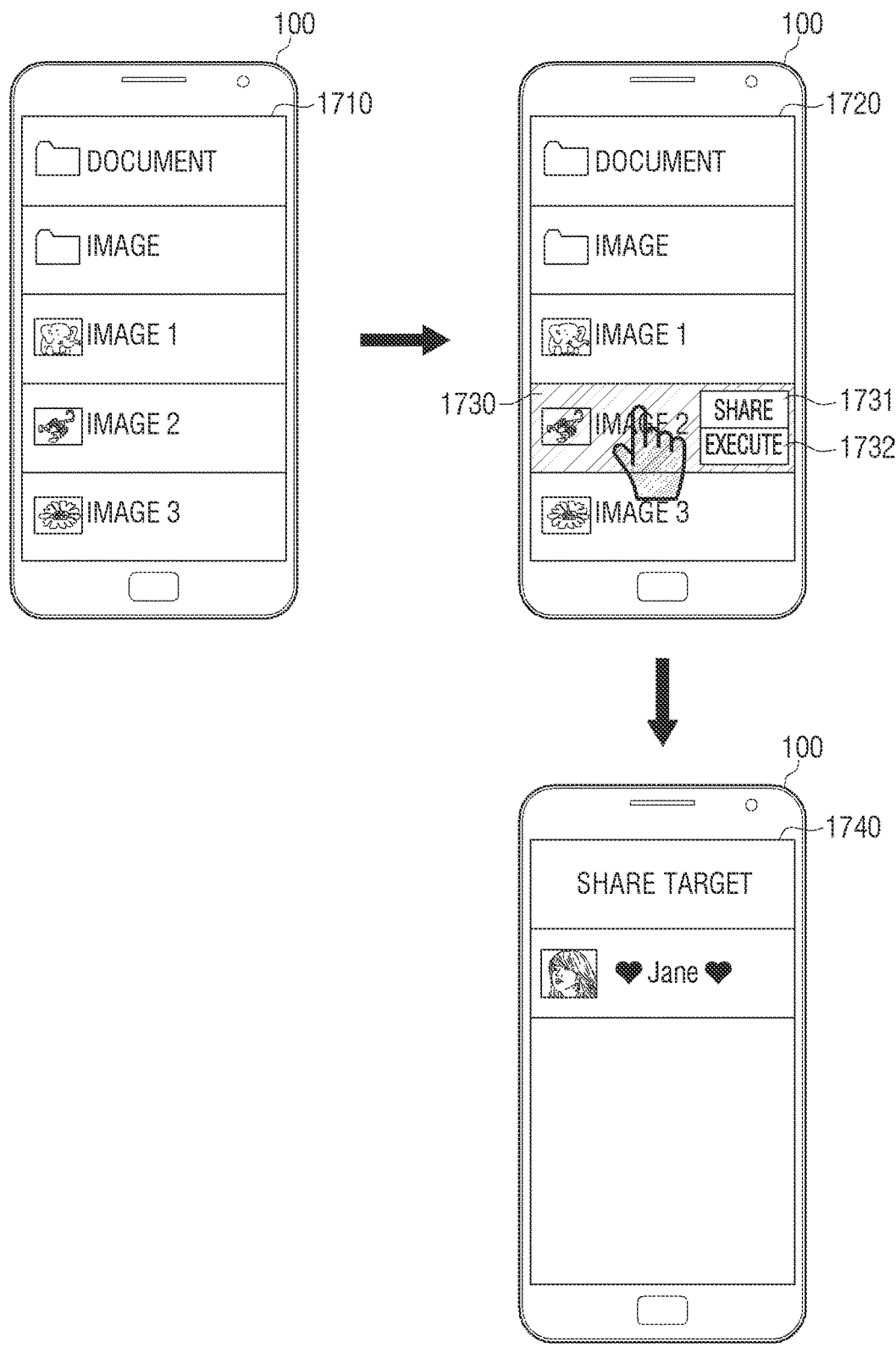

FIG. 20 is a diagram illustrating a method for sharing content according to an embodiment of the present disclosure. More particularly, FIG. 20 is a diagram illustrating a method for recommending share targets using PIMS information.

Referring to FIG. 20, if a list 1710 of images stored in the device 100 is displayed and one piece of an image content 1730 is selected from a list 1720 of images according to a user's touch operation, a GUI element 1731 for receiving an input of a share command and a GUI element 1732 for receiving an input of a reproduction command of the corresponding content may be displayed.

Thereafter, if the GUI element 1731 is selected, the device 100 may recommend the share targets based on the PIMS information stored in the cloud server. For example, if the date when the share command is input according to the PIMS information corresponds to a wedding anniversary, the device 100 may recommend "Jane" stored in the phone book as a mate as the share target, and display the recommended share target on a list 1740 of the recommended share target.

Accordingly, is the user selects the recommended share target, the device 100 may recommend the service to share the content. In this case, the device 100 may perform the recent interaction with another selected user, recommend the service, which has performed the interaction with the other selected user more than a certain number of times, and display the recommended service on the list.

Figure 21:
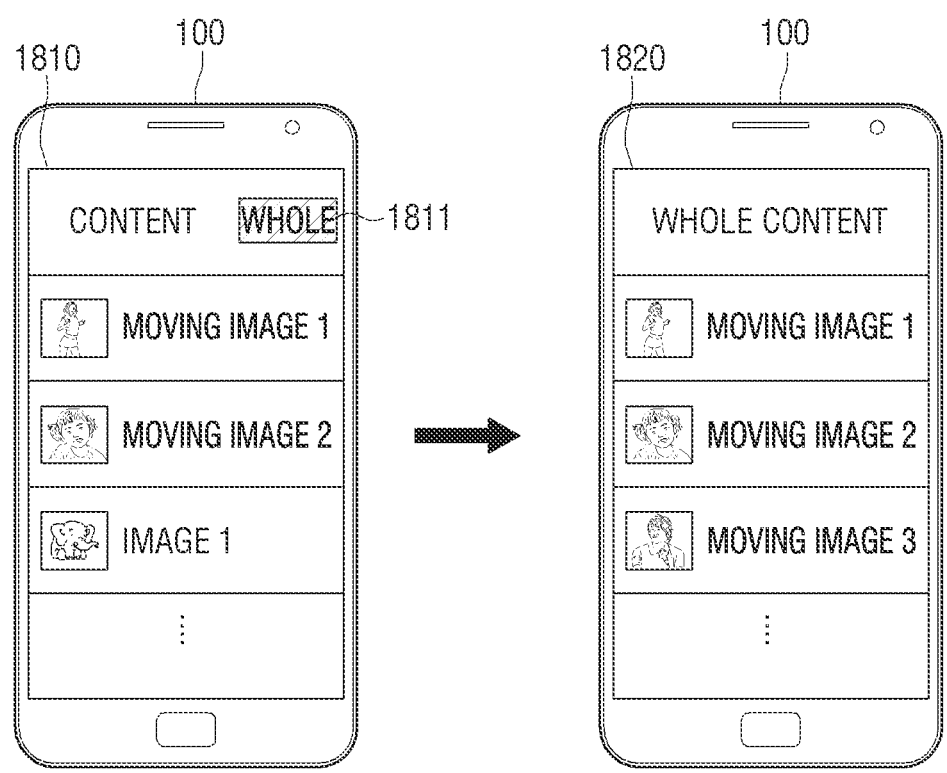

FIG. 21 is a diagram illustrating a method for sharing content according to an embodiment of the present disclosure.

Referring to FIG. 21, the device 100 may display a list for recommending content, share targets, and services based on context information. However, the content, the share targets, and the services, which the user intends to share on the displayed list, may not exist. In this case, based on the user command, the device 100 may display a list of all pieces of content stored in the device 100, display a list of all external devices, or display a list of all services available in the device 100.

For example, in a region of a list 1810 of the recommended content as shown in FIG. 21, a GUI element 1811 may be displayed. Here, the GUI element 1811 is prepared to receive an input of the user command for displaying the list of the whole content.

Accordingly, if the GUI element 1811 is selected, the list 1810 of the recommended list 1810 disappears, and a list 1820 of the whole content stored in the device 100 may be displayed. On the other hand, if the content is selected on the list 1820, the device 100 may share the selected content with the share target.

Figure 22:
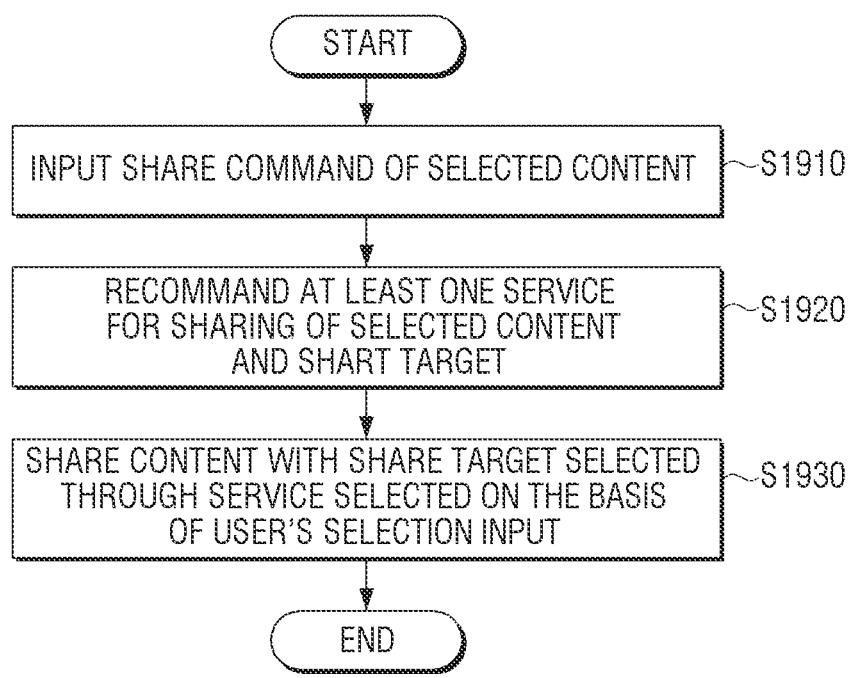
FIG. 22 is a flowchart illustrating a method for sharing content of a device according to an embodiment of the present disclosure.

FIG. 22 is a flowchart illustrating a method for sharing content of a device according to an embodiment of the present disclosure.

Referring to FIG. 22, a share command of the selected content is input at operation S1910.

Thereafter, at least one service and share targets to share the selected content are recommended among a plurality of services that can be used in the device 100 at operation S1920.

In this case, at least one service and share targets may be recommended using context information related to the operation of the device. Specifically, if the device performs the interaction with an external device, the context information related to the interaction may be collected and stored, and at least one service and the share targets may be recommended based on the stored contest information.

On the other hand, if the device performs the interaction with the external device, the context information may include at least one of information on the external device that performs the interaction with the device, time information when the interaction is performed, information on the content that is transmitted and received in the interaction process, information on the service through which the interaction is performed, or information on a position where the interaction is performed. The example of the context information has been described with reference to FIG. 2.

Accordingly, at least one of the external devices having a history in which the interaction is performed, which has recently performed the interaction with the device, or in which the number of times the external device performs the interaction is equal to or greater than a certain number of times, may be recommended as the share target.

Further, the at least one service, which has recently been used to perform the interaction with the external device, or in which the number of times the service performs the interaction is equal to or greater than a certain number of times, may be recommended as the at least one service for sharing the selected content.

Based on the at least one recommended service and the user selection input for the share targets, the content is shared with the selected share target through the selected service at operation S1930. In this case, in order to receive an input of the user selection input, a list of at least one recommended service and the share targets may be displayed.

Further, using the different sharing method according to the position in which the content is stored, the content can be shared with the selected share target through the service selected by the user. For example, if the content is content stored in the device, the content or the information related to the content may be transferred to the selected share target through the selected service. On the other hand, if the content is content stored in the server, authorization to access the content stored in the server may be given to the selected share target.

On the other hand, in this embodiment, based on the information on the selected content, the communication method for sharing the content may be determined. For example, a communication method for sharing the content may be determined based on the size of the content and the attribute of the content.

In an implementation, the at least one service to share the content among the plurality of services that are available in the device and the share target may be recommended based on situation information at a time when the share command is input.

In this case, the situation information may be determined based on at least one of a kind of the selected content, the time when the share command is input, a position of the device, or intention of the user who selects the content. Further, at least one sharable service by situation information and the share targets are matched and stored, at least one sharable service and the share targets, which match the situation information determined based on the stored information, are extracted, and the at least one extracted service and the share targets may be recommended.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. The non-transitory computer readable medium is not a medium that stores data for a short period, such as a register, a cache, or a memory, but is a medium which semi-permanently stores data and is readable by a device. Specifically, various applications and programs as described above may be stored and provided in the non-transitory computer readable medium, such as a CD, a Digital Versatile Disc (DVD), a hard disc, a Blu-ray disc, a USB, a memory card, and a ROM. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    displaying a plurality of image representations on a display of the electronic device, each of the plurality of image representations corresponding to a content item comprising one of an image or a moving image;
    in response to selecting an image representation from the plurality of image representations, displaying a sharing option for sharing a content item corresponding to the selected image representation;
    in response to selecting the sharing option, displaying a plurality of contact information and a plurality of communication applications for sharing the content item corresponding to the selected image representation, wherein an arrangement of the plurality of contact information changes based at least on a frequency of interactions with respect to the plurality of contact information;
    in response to selecting one contact information from the plurality of contact information, identifying a communication application associated with the selected one contact information for sharing the content item corresponding to the selected image representation, wherein the communication application corresponds to at least one of the plurality of communication applications, and the communication application provides an interface to receive character information; and
    transmitting the content item corresponding to the selected image representation toward a destination associated with the selected one contact information using the identified communication application.

2. The method of claim 1, wherein the interactions includes accessing the plurality of contact information.

3. The method of claim 2, wherein the plurality of contact information includes e-mail accounts.

4. The method of claim 1, wherein the arrangement includes displaying the plurality of contact information in order based on the frequency of interactions with respect to the plurality of contact information.

5. The method of claim 1, wherein the plurality of image representations includes at least one of an image or a moving image.

6. The method of claim 1,
    wherein the selecting of the sharing option includes receiving an input on the sharing option for sharing the content item corresponding to the selected image representation while reproducing the content item on the display of the electronic device.

7. The method of claim 1, further comprising:
    based on selecting at least two image representations from the plurality of image representations, displaying the plurality of contact information and the plurality of communication applications for sharing content items corresponding to the selected at least two image representations; and
    based on selecting one contact information from the plurality of contact information, transmitting the content items corresponding to the selected at least two image representations toward a destination associated with the selected one contact information using at least one of the plurality of communication applications.

8. An electronic device comprising:
    a display;
    a communication interface; and
    a processor configured to at least:
        control the display to display a plurality of image representations on the display, each of the plurality of image representations corresponding to a content item comprising one of an image or a moving image,
        in response to selecting an image representation from the plurality of image representations, control the display to display a sharing option for sharing a content item corresponding to the selected image representation,
        in response to selecting the sharing option control the display to display a plurality of contact information and a plurality of communication applications for sharing the content item corresponding to the selected image representation, wherein an arrangement of the plurality of contact information changes based at least on a frequency of interactions with respect to the plurality of contact information,
        in response to selecting one contact information from the plurality of contact information identify a communication application associated with the selected one contact information for sharing the content item corresponding to the selected image representation, wherein the communication applications, and the communication application provides an interface to receive character, and
        control the communication interface to transmit the content item corresponding to the selected image representation toward a destination associated with the selected one contact information using the identified communication application.

9. The electronic device of claim 8, wherein the interactions includes accessing the plurality of contact information.

10. The electronic device of claim 9, wherein the plurality of contact information includes e-mail accounts.

11. The electronic device of claim 8, wherein the arrangement includes displaying the plurality of contact information in order based on at least the frequency of interactions with respect to the plurality of contact information.

12. The electronic device of claim 8, wherein the plurality of image representations includes at least one if an image or a moving image.

13. The electronic device of claim 8, wherein the selecting of the sharing option includes receiving an input on the sharing option for sharing the content item corresponding to the selected image representation while reproducing the content item on the display of the electronic device.

14. The electronic device of claim 8, wherein the processor is further configured to;
- based on selecting at least two image representation from the plurality of image representations, control the display to display the plurality of contact information and the plurality of communication applications for sharing content items corresponding to the selected at least two image representations, and
- based on selecting one contact information from the plurality of contact information, control the communication interface to transmit the content items corresponding to the selected at least two image representations toward a destination associated with the selected one contact information using at least one of the plurality of communication applications.

\* \* \* \* \*